US009734321B2

(12) United States Patent
Ahmed et al.

(10) Patent No.: US 9,734,321 B2
(45) Date of Patent: Aug. 15, 2017

(54) METHOD AND APPARATUS FOR PROVIDING FEDERATED SERVICE ACCOUNTS

(71) Applicant: Nokia Technologies Oy, Espoo (FI)

(72) Inventors: Zahid Ahmed, Westborough, MA (US); Peter Herbert, Berlin (DE); Henri Kujala, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 72 days.

(21) Appl. No.: 14/363,483

(22) PCT Filed: Dec. 5, 2012

(86) PCT No.: PCT/FI2012/051211
§ 371 (c)(1),
(2) Date: Jun. 6, 2014

(87) PCT Pub. No.: WO2013/087984
PCT Pub. Date: Jun. 20, 2013

(65) Prior Publication Data
US 2014/0337954 A1 Nov. 13, 2014

Related U.S. Application Data

(60) Provisional application No. 61/569,620, filed on Dec. 12, 2011.

(51) Int. Cl.
*G06F 21/41* (2013.01)
*H04L 29/06* (2006.01)

(52) U.S. Cl.
CPC .......... *G06F 21/41* (2013.01); *H04L 63/0815* (2013.01); *G06F 2221/2149* (2013.01)

(58) Field of Classification Search
CPC ..... H04L 63/0815; H04L 63/08; H04L 63/10; H04L 63/102; H04L 63/105; G06F 21/41
(Continued)

(56) References Cited

U.S. PATENT DOCUMENTS 7,657,639 B2  2/2010 Hinton
8,984,588 B2  3/2015 Otranen et al.
(Continued)

FOREIGN PATENT DOCUMENTS

CN  101420416 A  4/2009
CN  102857403 A  1/2013
(Continued)

OTHER PUBLICATIONS

International Search Report and Written Opinion received for corresponding Patent Cooperation Treaty Application No. PCT/FI2012/051211, dated Mar. 25, 2013, 16 pages.
(Continued)

*Primary Examiner* — Noura Zoubair
(74) *Attorney, Agent, or Firm* — Ditthavong & Steiner, P.C.

(57) ABSTRACT

An approach is provided for determining that a user has been authenticated for an access to at least one service using a federated identity (401). The approach also comprises determining federated account information associated with the user based, at least in part, on one or more user accounts associated with the federated identity, the at least one service, the at least one or more other services, or a combination thereof (403). The approach further comprises determining one or more functions of the at least one service, the at least one or more other services, or a combination thereof to make available to the user based, at least in part, on the federated account information (411).

20 Claims, 13 Drawing Sheets

(58) Field of Classification Search
USPC .............................................................. 726/8
See application file for complete search history.

(56) References Cited

U.S. PATENT DOCUMENTS

| | | | |
|---|---|---|---|
| 2003/0149781 A1 | 8/2003 | Yared et al. | |
| 2004/0128378 A1 | 7/2004 | Blakley et al. | |
| 2006/0236382 A1* | 10/2006 | Hinton ................ | H04L 63/0815 726/8 |
| 2008/0016232 A1* | 1/2008 | Yared ...................... | G06F 21/41 709/229 |
| 2009/0328178 A1 | 12/2009 | McDaniel et al. | |

FOREIGN PATENT DOCUMENTS

| | | | | |
|---|---|---|---|---|
| EP | 1569405 | * | 8/2005 | ............. H04L 67/30 |
| EP | 1569405 A1 | | 8/2005 | |
| WO | 03/073783 A1 | | 9/2003 | |
| WO | 2005/109822 A1 | | 11/2005 | |
| WO | 2010/028691 A1 | | 3/2010 | |
| WO | 2010/056655 A1 | | 5/2010 | |

OTHER PUBLICATIONS

Office Action for corresponding European Patent Application No. 12857854.9-1853, dated Oct. 9, 2015, 9 Pages.

"Federated Identity Patterns in a Service-Oriented World", The Architecture Journal Microsoft, Retrieved on Nov. 2, 2015, Webpage available at : https://msdn.microsoft.com/en us/library/cc836393.aspx.

Extended European Search Report received for corresponding European Patent Application No. 12857854.9, dated Sep. 22, 2015, 8 pages.

Office Action for corresponding Chinese Patent Application No. 201280068704.1 dated Apr. 1, 2016, with English-language summary, 17 Pages.

* cited by examiner

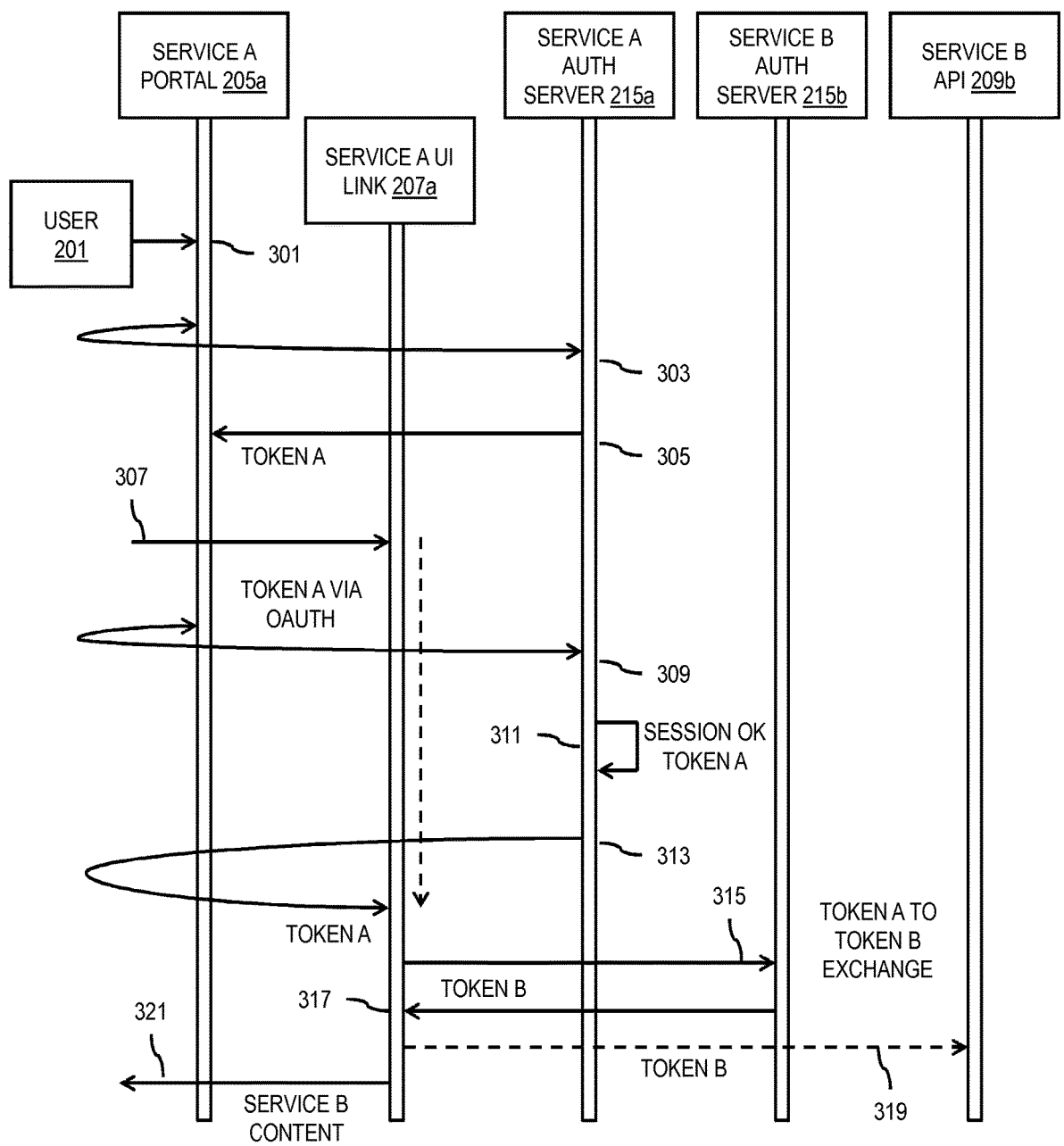

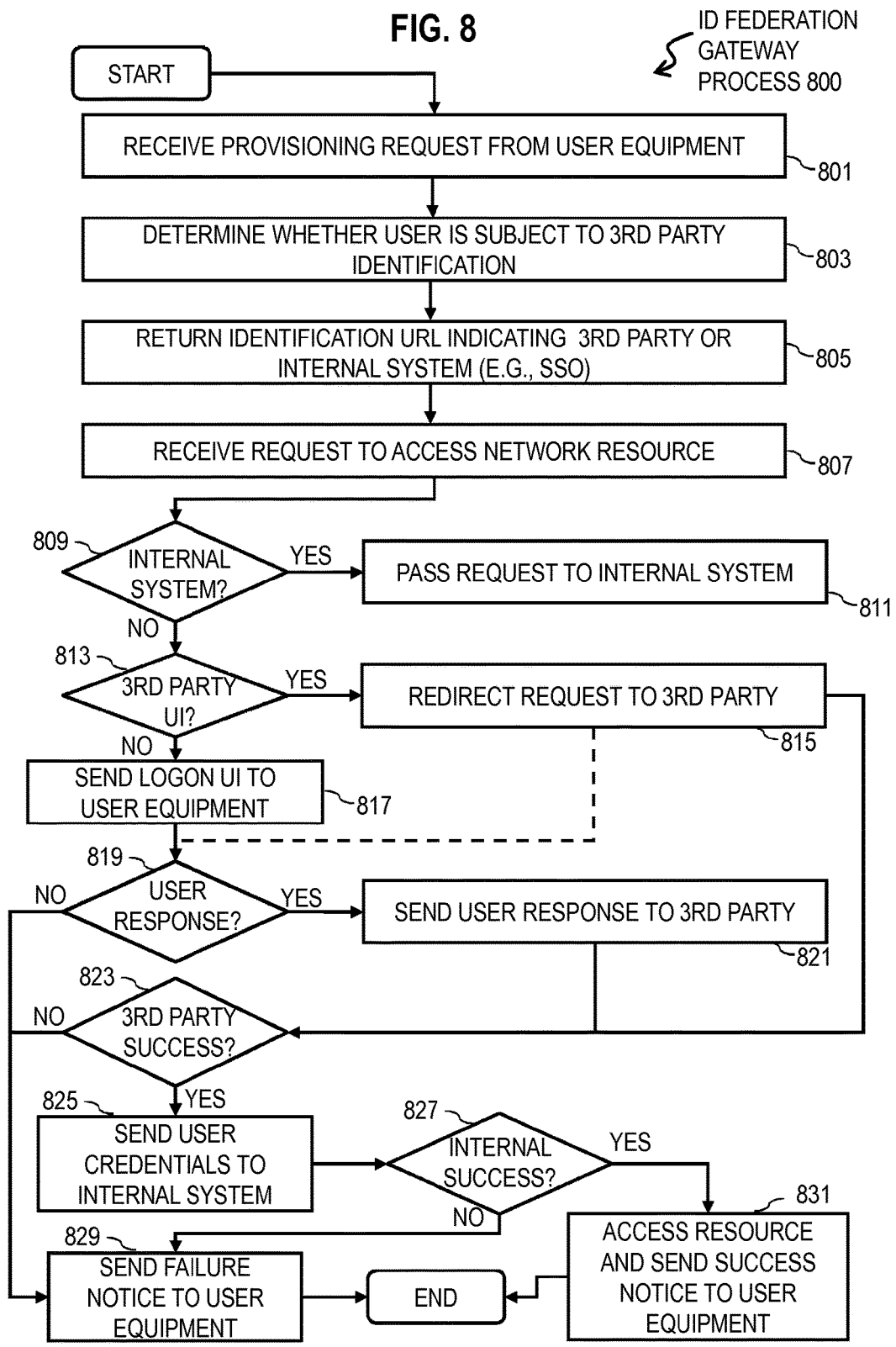

METHOD AND APPARATUS FOR PROVIDING FEDERATED SERVICE ACCOUNTS

RELATED APPLICATION

This application was originally filed as Patent Cooperation Treaty Application No. PCT/FI2012/051211 filed Dec. 5, 2012 which claims priority benefit to U.S. Provisional Patent Application No. 61/569,620, filed Dec. 12, 2011.

BACKGROUND

Network service providers and device manufacturers are continually challenged to deliver value and convenience to consumers by, for example, providing a suite of compelling network services. Subscription network services traditionally involve authenticating users during a user sign-on process. However, network resources are wasted and user experience is diminished when a user is required to sign-on several times to participate in multiple services. Thus there is a move to allow a user to sign-on once and thereby gain access to several services from the same provider.

Federated identity, or the "federation" of identity, refers to technologies, standards and use-cases which serve to enable the portability of identity information across otherwise autonomous security domains, e.g., by different providers. The ultimate goal of identity federation is to enable users of one domain to securely access data or systems of another domain seamlessly, and without the need for completely redundant user administration. As part of this goal, service providers and device manufacturers also face significant technical challenges to ensuring that once a user is authenticated into multiple services via a federated identity, service account information (e.g., user profile information, billing information, payment information, etc.) can also be federated or coordinated across the services to provide a seamless user experience.

SOME EXAMPLE EMBODIMENTS

Therefore, there is a need for an approach for enabling a federation of service accounts for services that rely on federated identification and/or authentication of users (e.g., services participating in single sign-on processes).

According to one embodiment, a method comprises determining that a user has been authenticated for an access to at least one service using a federated identity. The federated identity is associated with the at least one service, at least one or more other services, or a combination thereof. The method also comprises determining federated account information associated with the user based, at least in part, on one or more user accounts associated with the federated identity, the at least one service, the at least one or more other services, or a combination thereof. The method further comprises determining one or more functions of the at least one service, the at least one or more other services, or a combination thereof to make available to the user based, at least in part, on the federated account information.

According to another embodiment, an apparatus comprising at least one processor, and at least one memory including computer program code for one or more computer programs, the at least one memory and the computer program code configured to, with the at least one processor, cause, at least in part, the apparatus to determine that a user has been authenticated for an access to at least one service using a federated identity. The federated identity is associated with the at least one service, at least one or more other services, or a combination thereof. The apparatus is also caused to determine federated account information associated with the user based, at least in part, on one or more user accounts associated with the federated identity, the at least one service, the at least one or more other services, or a combination thereof. The apparatus is further caused to determine one or more functions of the at least one service, the at least one or more other services, or a combination thereof to make available to the user based, at least in part, on the federated account information.

According to another embodiment, a computer-readable storage medium carrying one or more sequences of one or more instructions which, when executed by one or more processors, cause, at least in part, an apparatus to apparatus to determine that a user has been authenticated for an access to at least one service using a federated identity. The federated identity is associated with the at least one service, at least one or more other services, or a combination thereof. The apparatus is also caused to determine federated account information associated with the user based, at least in part, on one or more user accounts associated with the federated identity, the at least one service, the at least one or more other services, or a combination thereof. The apparatus is further caused to determine one or more functions of the at least one service, the at least one or more other services, or a combination thereof to make available to the user based, at least in part, on the federated account information.

According to another embodiment, an apparatus comprises means for determining that a user has been authenticated for an access to at least one service using a federated identity. The federated identity is associated with the at least one service, at least one or more other services, or a combination thereof. The apparatus also comprises means for determining federated account information associated with the user based, at least in part, on one or more user accounts associated with the federated identity, the at least one service, the at least one or more other services, or a combination thereof. The apparatus further comprises means for determining one or more functions of the at least one service, the at least one or more other services, or a combination thereof to make available to the user based, at least in part, on the federated account information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a time sequence diagram that illustrates a sequence of messages and processes for federation of service accounts, according to various embodiments;

FIG. 8 is a flowchart of a process for an identifier (ID) federation gateway, according to one embodiment;

DESCRIPTION OF SOME EMBODIMENTS

Examples of a method, apparatus, and computer program for providing federated service accounts are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term network resource refers to any service or data structure or communication link available through connection to a network. A single sign-on (SSO) process refers to any process of one or more providers, which enables a user, during one session connected to the network, to access a plurality of network resources from that providers without redundant entry by the user of user identification information. In one embodiment, a provider is often identified by a single network domain name in the uniform resource identification (URI) naming system, as used for example with a uniform resource locator (URL) naming system. An example single sign-on process is the single sign-on processes for the OVI™ system of the NOKIA CORPORATION™ of Espoo, Finland. An access provider is a network service provider that grants access for user equipment (e.g., UE 101, described below) to access a network (e.g., communication network 105, described below). As used herein, an identification process (e.g., identifying) includes determining an identity, or authenticating a particular user as having that identity, or determining that the particular user is authorized to access one or more services, or some combination.

Although various embodiments are described with respect to involving, in the SSO of a network resource provider, identification by a different network access provider, it is contemplated that the approach described herein may be used with other sets of two or more different providers and any federated identity services with legacy authentication processes, whether SSO processes or not.

Figure 1:
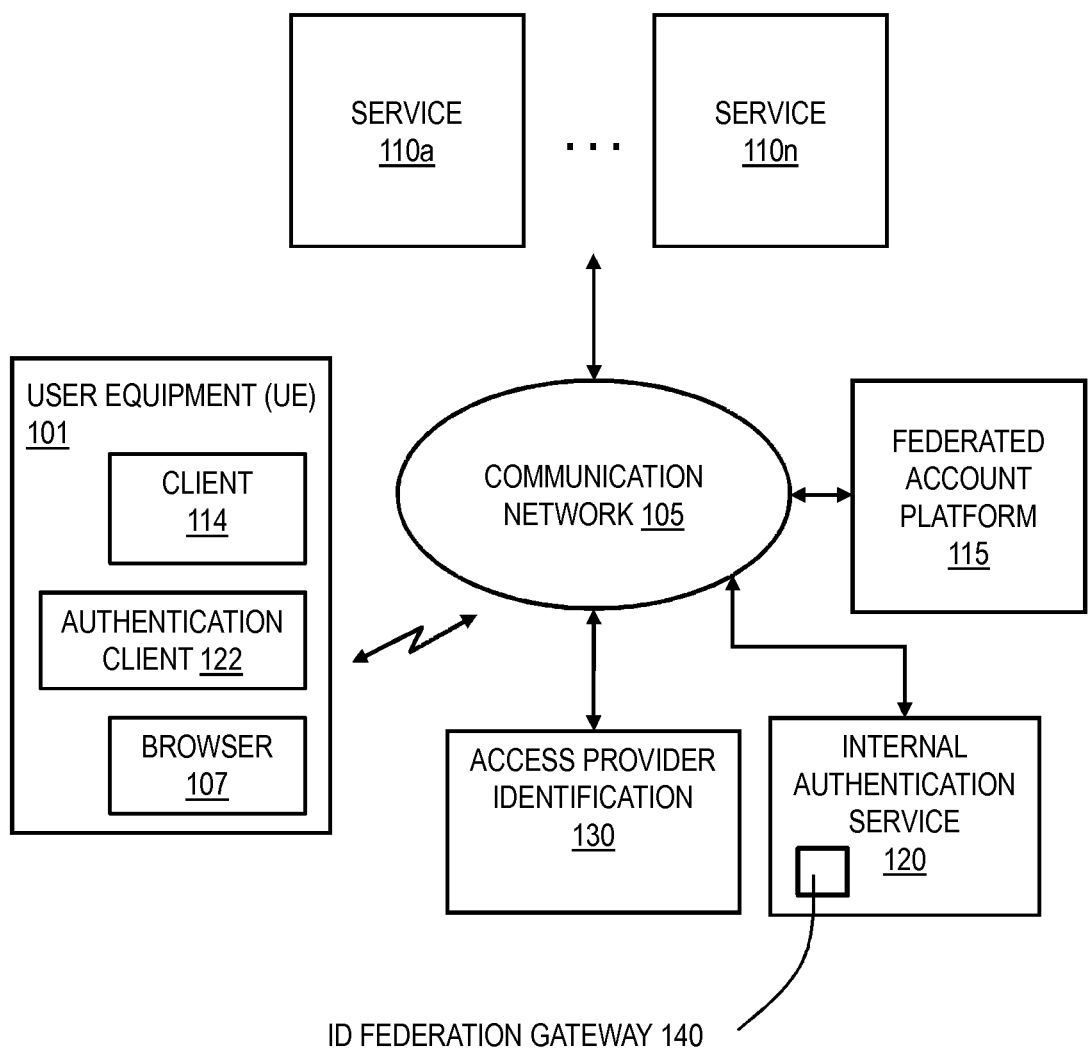
FIG. 1 is a diagram of a system capable of providing federated service accounts, according to one embodiment.

FIG. 1 is a diagram of a system 100 capable of providing federated service accounts, according to one embodiment. The system 100 includes a communication network 105, user equipment 101, multiple network resources, including services 110a through 110n (collectively referenced hereinafter as network services 110) available through an internal authentication service 120 of the resource provider. Also included is an access provider identification service 130 as an example of federated identity services. Traditionally, for a user of UE 101 to be identified by the federated identity services, each component of the internal authentication service 120, corresponding to each service 110a through 110n, would be modified to interact with the federated identity services to obtain the user credentials. This is an error-prone process affecting many different areas of memory, and consuming processing resources as each component is modified, compiled and stored in executable form. Each update of the federated identity services would similarly be propagated to all the components of internal authentication service 120, consuming even more processing resources. If replicated on multiple hosts for safety, the consumption of processing resources and bandwidth resources are even greater. Similarly, client processes on each of many thousands of user equipment, such as cell phones, would be modified to interact with the federated identity services. These modifications consume valuable processing power, memory, battery life, and communication bandwidth that is especially scarce on mobile terminals.

Moreover, as discussed briefly above, once a user is authenticated to access multiple services via a federated identity, service providers face additional challenges to providing a seamless user experience across the corresponding multiple services. In other words, although a user may use a single federated identity to reduce the burden of having to sign into each separate service, the federated identity process generally does not provide for continuity of experience across the multiple services or multiple sessions of the services. For example, account information (e.g., billing information, payment information, etc.) established by the user in one service may not be available to the user when use another service even when the user has used a federated identity to access the other service. In some cases, sharing of account information may be further restricted by privacy policies, security policies, regulations, business standards (e.g., Payment Card Industry (PCI) data security standards, etc.), and the like.

To address these problems, the system 100 introduces the capability to provide federated of service accounts so that a user's service profile, account information, etc. established in one service can be used, transferred, or otherwise accessed by another service that shares a common federated identity for the user. In one embodiment, the service account information shared in federated service accounts include, at least in part, billing information, payment information, invoicing information, and/or other information related to potentially sensitive user information. In this way, when a user accesses a service by authenticating through another service (e.g., through a federated identity), the user can make a purchase in one service (or otherwise access a function involving payment or billing) using payment information already established in an account established in the other service, and vice-versa.

In one embodiment, the system 100 provides federated service accounts (e.g., service accounts or account information that can be shared by a user among different services) through the creation of shadow accounts associated with each service. For example, when a user authenticates using a federated identity to multiple services and accesses a particular one of the services, the system 100 can create a shadow account in that particular service to capture user session information and provide continuity of user interaction across multiple sessions of the service. In one embodiment, the shadow account can be linked to the federated identity or an authentication token associated with the federated identity without requesting additional information from the user.

In some embodiments, the shadow account includes a subset of information available from federated account information or other service accounts. For example, even though federated account information or information in other service accounts may include complete contact information, billing information, etc., the shadow account may be created using only a minimal set of fields of data taken from the account information (e.g., to comply with privacy policies, security policies, business policies, regulations, etc.). For instance, even though complete contact information (e.g., name, address, phone number, etc.) may be available, the shadow account may be created to include only the user's name. Similarly, in one embodiment, a shadow account may not include billing account information. Accordingly, they system 100 and/or the applicable service may provide for differentiated access to service content and/or functions when compared to full accounts established directly through the service. For example, a shadow account may enable a user to browse a service's catalog of products, but a full account is needed to make a purchase from the catalog.

In another embodiment, the system 100 may provide for "just-in-time" sharing of account information. More specifically, the system 100 may share account information among federated service accounts only when a user or the service requires the information when accessing a function or content provided by a service. By way of example, billing account information may not be shared from one federated service account to another until a user actually attempts or makes a request to purchase an item. In another example, contact information (e.g., a home address) for a user may not be shared with a federated service account until the contact information is needed by the service.

In one embodiment, the system 100 can recommend to the user to convert a shadow account to a full account. For example, if the user attempts to access a function, content, etc. of a service that requires a full account, the system 100 can recommend that the user create the new account. In one embodiment, creating a new account includes, at least in part, a request to the user to provide authentication credentials for the service that is different from the federated identity. In this way, the user can then access the service via either the federated identity (e.g., an authentication token associated with the federated identity) or the authentication credentials provided to establish the full account.

In another embodiment, when a federated identity is deleted or otherwise dissolved, the system 100 can continue to enable authentication to the individual services previously served by the federated identity via the respective authentication credentials used to create the full account. In some embodiments, on receiving a request to dissolve a sharing of the federated identity among multiple services, the system 100 can request that the user convert to full accounts for the respective services before the dissolution of the federated identity. Accordingly, the user will continue to have access to the services and maintain service information even after the services no longer shared or recognize the user's federated identity.

As shown in FIG. 1, the system 100 includes an ID federation gateway 140 for controlling the interactions between the legacy authentication service and federated identity services, such as the access provider identification service 130, as well as interactions between a legacy authentication client 122 (such as a SSO device enabler (DE)

process) and the service federated identity services. Thus the gateway 140 is an example means of achieving the advantage of reducing network resources to utilize federated identity services with legacy authentication service, as well as for other providers and their internal authentication services, if any (not shown). Internal authentication service 120 is a modified process that includes the legacy authentication service and the ID federation gateway 140.

In one embodiment, the ID federation gateway 140 interacts with the federated account platform 115 to manage, synchronize, and/or otherwise coordinate federated service accounts and account information among the services 110a-110n. The federated account platform 115, in one embodiment, includes one or more components for managing federated service accounts as described in the various embodiments discussed herein. It is also contemplated that all or a portion of the functions of the federated account platform 115, the ID federation gateway 140, or a combination thereof may be performed by components of equivalent functionality or reside in other components of the system 100.

In one embodiment, the system 100 comprises user equipment (UE) 101 having connectivity to the federated account platform 115, internal authentication service 120 and services 110a through 110n and access provider identification service 130 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, federated account platform 115, services 110, internal authentication service 120 and access provider identification service 130 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages described by the hypertext markup language (HTML).

In the illustrated embodiment, UE 101 includes a client process 114 for at least one of the network services 110, a web browser 107 and an authentication client module 122.

The authentication client module 122 may be implemented as a chip set as shown in FIG. 7 and described below, with or without one or more computer program instructions. In the legacy authentication system, when the browser 107 or client 114 attempts to send a message requesting a service 110 of the resource provider, the authentication client module 122 intercepts the message and directs the request to the legacy authentication service. The legacy authentication service determines whether a user of the UE 101 is already signed-on during the current session with network 105. If not, a user interface (UI) is sent to the authentication client module 122 to present to the user to prompt for user inputs employed to identify the user. The UI may be included in any manner known in the art, such as a script in an HTML document delivered via HTTP. Based on those inputs, communicated from the authentication client module 122 to the legacy authentication service, the user is either accepted or rejected by the legacy authentication service. A rejection is communicated to the user through the authentication client module 122. If accepted, an authentication token is passed to the authentication client module 122 for use in further requests for other services 110 during the current session. Subsequent messages from client 114 or browser 107, requesting a network service 110 of the provider, are intercepted by the authentication client module 122 and sent to the legacy authentication service with the authentication token. If the authentication token is not out of date, the request is forwarded to the correct service 110 with whatever credentials required by the service 110 to perform the requested service. If out of date, the UI is sent by the internal authentication service 120 to the authentication client module 122 to present to the user, as described above.

By way of example, the federated account platform 115 and the ID federation gateway 140 include one or more components for providing an ID federation gateway and federated service accounts. The platform 115 and the gateway 140 may be implemented as a chip set as shown in FIG. 7 described below, with or without one or more computer program instructions. It is contemplated that the functions of these components may be combined in one or more components or performed by other components of equivalent functionality on one or more hosts connected to network 105. The federated account platform 115 and ID federation gateway 140 abstract third party federated identity services for both services 110 (such as OVI Services) and legacy authentication service (such as OVI SSO).

Figure 2A:
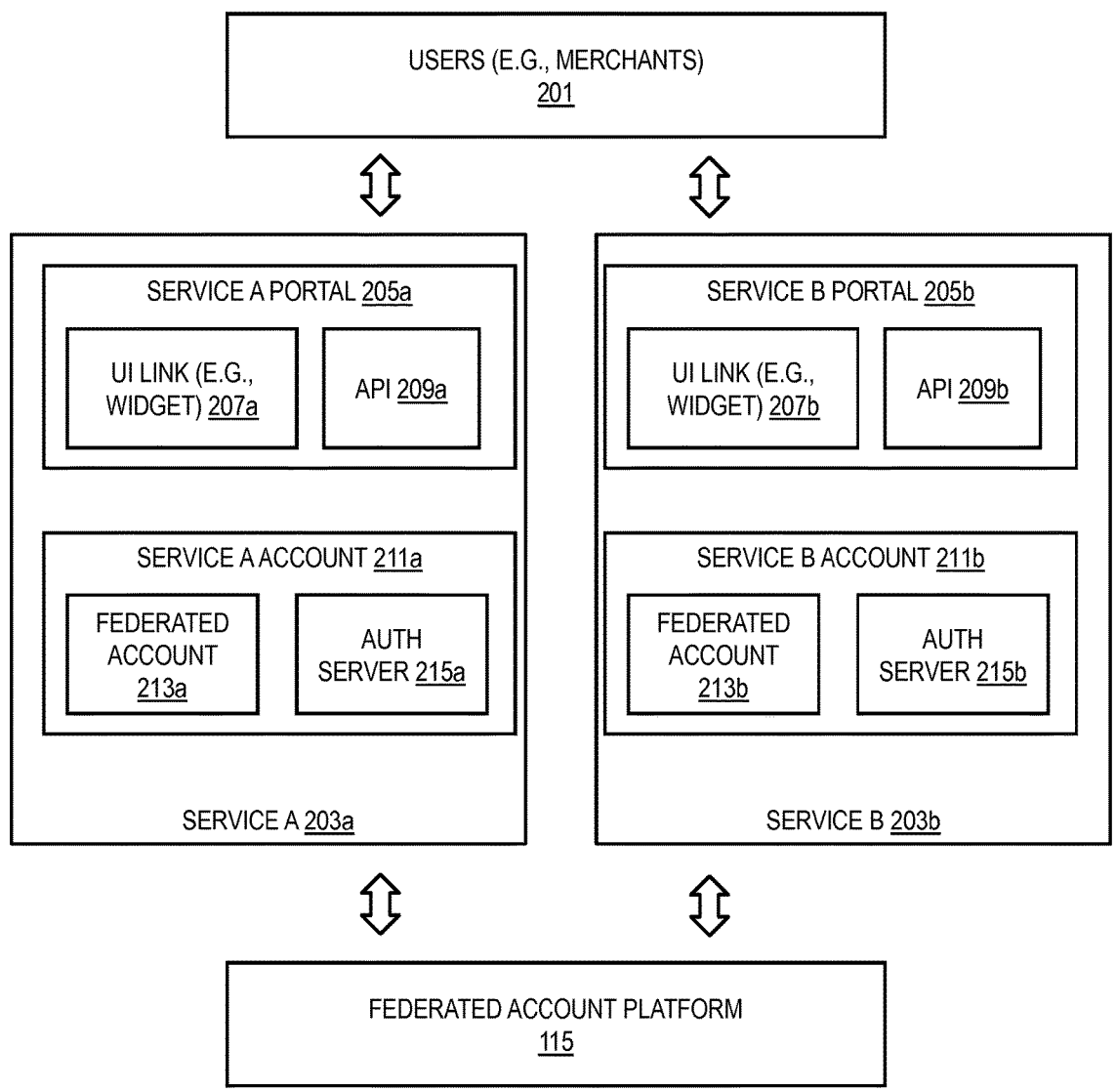
FIG. 2A is a diagram of federating service accounts across multiple services, according to one embodiment.

FIG. 2A is a diagram of federating service accounts across multiple services, according to one embodiment. As shown, users 201 (e.g., merchants, consumers, etc.) can access Service A 203a and Service B 203b, respectively, via a Service A portal 205a and a service B portal 205b through a federated identity process (e.g., as described below with respect to FIGS. 6A to 9).

Under one use case, the Service A 203a and the Service B 203b provide business services to users 201 who are merchants. More specifically, the principal actors in this use case include: (1) a merchant user 201; (2) a self-service interface (SSI) portal, e.g., Service A portal 205a or Service B portal 205b; and (3) a federated account platform 115 that enables federated single-sign-on access across partner services or portals. However, it is contemplated that the various embodiments are applicable to any type of service (e.g., consumer services) and/or users 201 (e.g., consumers).

As preconditions under this example, the merchant user 201 is registered with the Service A 203a, and has agreed to terms and conditions including SSO-based federation to partner sites (e.g., Service A 203a in partnership with Service B 203b), and account data sharing (e.g., federated service accounts) among the partners to enable a better user experience. The merchant user 201 has an active Service A account 211a and is logged-in with a valid SSO token (e.g., via the authentication server 215a and ID federation gateway 140).

While browsing within Service A 203a, the merchant user 201 discovers product information associated with Service B 203b. The merchant user 201 clicks a corresponding UI link 207a (e.g., a link, a widget, etc.) for the production information which results in serving of a landing page on the partner portal (e.g., Service B portal 205b), including seamless navigation. As a result of the clicking the link to the product information associated with Service B 203b, the federated account platform 111 through a federation APIs 209a processes the SSO token to return a federation SSO token (e.g., in OAuth format) to the landing page. In this example, the federation SSO token is scoped for the target partner portal (e.g., Service B portal 205b).

The Service B portal 205b then validates the federation SSO token, and creates a shadow account (e.g., federated account 213b) for the user in Service B 203b. As result, the merchant user 201 is able to access the functions, content, services, etc. of Service B 203b.

In another use case, the merchant user 201 wants to purchase the products linked to Service B 203b. This case assumes the same conditions as described above, and the merchant user 201 has completed clicking and viewing the resulting product information in Service B 203b. After reviewing the information, the merchant user 201 decides to buy the product offered by Service B 203b. In this case, as part of creating the federated account 213b for the Service B 203b, billing/payment account information is included in the federated account. In addition, the merchant 201 may also be asked to register and/or validate billing account or other identification information to transfer or create the billing/payment account information.

In another embodiment, on clicking a link to purchase the product, the service B account 211b may request the billing/payment account information for the user from the service A account 211a. The request may include the federation SSO token for authentication and/or validation along with the request to share the billing/payment information. On receipt of the billing/account information from Service A account 211a, the Service B account 211b may include the billing/payment information in the federated account 213b or create a separate billing account under Service B 203b for the user. In either case, Service B 203b uses the billing/payment information to complete the transaction and deliver the product to the merchant user 201. With this process, the billing/payment information represents federated account information that can be obtained without requiring the user to reenter the payment information in Service B 203b when the user has already provided the information to Service A 203a, thereby reducing data entry burden on the merchant user 201 and improving user experience.

In some embodiments, Service A 203a and Service B 203b may engage in further information sharing or federation of service accounts post transactions depending, e.g., on privacy policies, security policies, business standards, regulations, etc. For example, both Service A 203a and Service B 203b can bill the merchant user 201 for their respective products using federated service account information. Service A 203a and Service B 203b then can further enter into revenue sharing agreements, transaction history sharing agreements, etc. that can be enforced and/or facilitated by the federated account platform 115.

In other embodiments, the federated account platform 113 can share federated service account information under different schemes. For example, Service A 203a and Service B 203b may enact a "double billing account input." Under this scheme, both services own the user 201 (e.g., maintain relationships with the user 201). Accordingly, both service portals can request the merchant user 201 to enter this account information (e.g., billing account information), and there will be no sharing of billing or payment information between the two services.

Under another scheme, Service A 203a and Service B 203b may enact a "single billing account input." For example, both services own the user 201 by having separate user accounts under each service, but share billing account information. In a variation of this scheme, each respective service may independently validate the shared billing/payment account information. The validation may include, for instance, requesting CVV2 input for credit card billing information.

Under yet another scheme, Service A 203a and Service B 203b may enact a "single billing account input, with single validation." In this case, either one or both of the services can own the user 201. The services then share or create a common billing account for the merchant user 201 in a centralized payment gateway.

Under another scheme, Service A 203a and Service B 203b may enact a "single billing account input, with single ownership." In this case, either one or both of the services can own the user 201. The owning service can then act as the payment gateway for the other service.

Figure 2B:
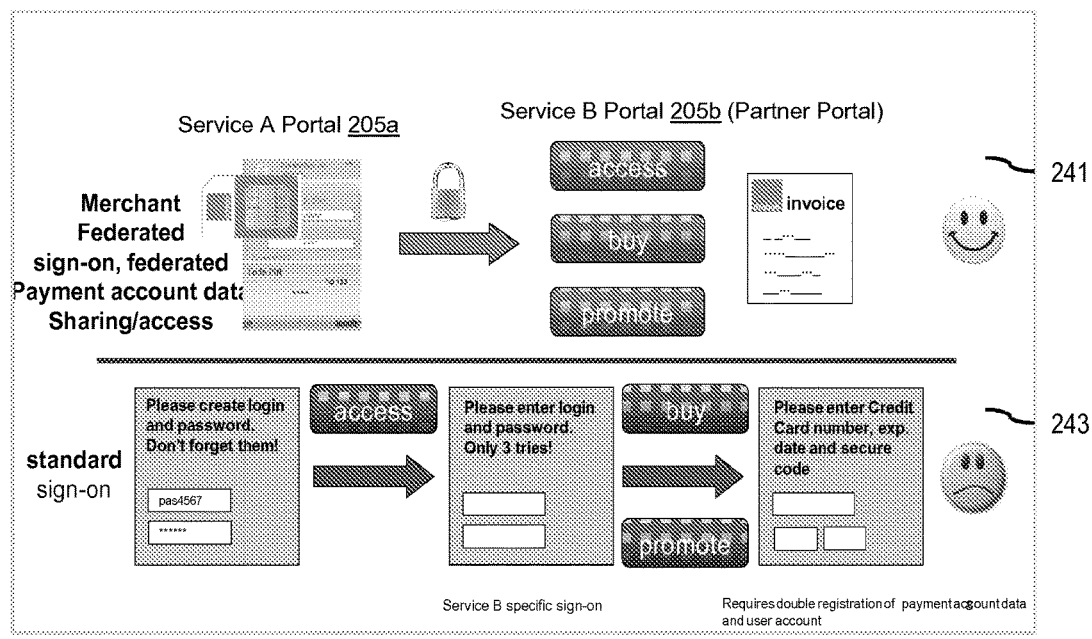
FIG. 2B is a diagram comparing a federated service account process to a standard sign-on process, according to one embodiment.

FIG. 2B is a diagram comparing a federated service account process to a standard sign-on process, according to one embodiment. As shown, the process 241 illustrates a simplified, seamless sign-on to partner services (e.g., Service A portal 205a and Service B portal 205b). In the example of process 241, a federated sharing of payment account data is performed such that an invoice is still generated by partner portal (e.g., Service B portal 205b) for any service or promotions the merchant user 201 ends up buying from the partner portal. In one embodiment, the purchase is completed by a user 201 that first signs into the Service A portal 205a via a federated identity shared with Service B portal 205b. As a result, the user 201 need not sign in separately into the Service B portal 205b because the system 100 automatically shares the payment information associated with the user 201 from the Service A portal 205a to the Service B portal 205b.

In contrast, as shown in the process 243, a standard or traditional sign-on process typically asks the user to first sign into Service A portal 205a. When the user 201 moves from Service A portal 205a to Service B portal 205b, the user 201 is likely to be asked for separate authentication credentials and/or payment information when operating in the Service B portal 205b. In this case, no service account information is shared, thereby requiring the user to reenter information (e.g., credentials or payment information) and reducing the user experience.

FIG. 3 is a time sequence diagram that illustrates a sequence of messages and processes for federation of service accounts, according to various embodiments. A network process on the network is represented by a thin vertical box, labeled at the top. A message passed from one process to another is represented by horizontal arrows. A step performed by a process is indicated by a box or looping arrow overlapping the process at a time sequence indicated by the vertical position of the box or looping arrow. The processes represented in FIG. 3 are a Service A portal 205a, a Service A UI link 207a, a Service A authentication server 215a, a Service B authentication server 215b, and a service B API 209b.

A new user 201 to the Service A portal 205a transmits a message 301 requesting to sign up for an account with Service A 203a. The request can include, for instance, credentials such as a username and password. In response, the Service A portal 205 requests the creation of a new account to be created by the service A authentication server 215a in a message 303. The user 201 signs in with the credentials and the service A authentication server 215a returns a message 305 including an authentication Token A. In other words, a Service A session is established in the browser client that the merchant user 201 is using to access the Service A portal 205a.

The user 201 clicks on a service A UI link 207a to information related to Service B 203b. The click is transmitted as a message 307. For example, the message 307 is initiated by the merchant user 201 who is not single signed onto the Service A portal 205a, where the merchant user 201 finds a link or embedded web UI widget 207a that allows the merchant user 201 to seamlessly navigate to the partner portal (e.g., Service B portal 205b). In one embodiment, the UI link 207a is a web link or widget embedded in a landing page of the Service A portal 205a. On detecting the click, the Service A portal 205a provides the Token A to the service A authentication server 215A in a message 309 using, for instance, OAuth for transmission to the Service B 203b. The service A authentication server 215a validates the token in a process 311, and transmits the validated Token A to the UI Link 207a associated with Service B 203b via a message 313.

In one embodiment, the Service A authentication server 215a generates OAuth standard format token that is based, at least in part, on the Token A (e.g., a federated identity token) and is scoped for Service B portal 205b destination. The scoping, for instance, enables the Service B authentication server 215b to "join" the session already established by the merchant user 201 as a result of signing on the Service B portal through, e.g., a federated identity.

The UI Link 207a then transmits the Token A to the Service B authentication server 215b for validation by Service B 203b via a message 315. For example, the newly minted OAuth Token is returned to the browser client as part of an existing session for Service A portal 205a from where the browser client redirects or seamlessly navigates to the Service B portal 205b such that the destination URL includes the OAuth token (or a reference to the OAuth token which is used by the Service B portal 205b to retrieve the actual OAuth token via, e.g., a GetToken API exposed by the Service A authentication server 215a). In one embodiment, in the case of a federated token or identity, the Service B authentication server 215b validates the token and need not call back to the Service A authentication server 215a to verify the validity of the Token A. Instead, the Service B authentication server 215b performs standard security checks, expiration checks, etc. based on token parsing. In one embodiment, on validation of the Token A, the service B authentication server 215b may perform exchange the Token A for Token B for access to Service B 203b functions, content, services, etc.

In another embodiment, Service B portal 205b will validate the OAuth token (e.g., Token A) included in the URL link invoked by the Service A portal 205a as part of the seamless navigation process. Token B is then returned to the UI Link 207a in the Service A portal 205a via a message 317. For example, the validation of OAuth token will result in the Service B authentication server 215b creating Token B that is trusted by the merchant facing web applications exposed in the Service B portal 205b. The UI Link can optionally send the Token B for validation via the Service B API 209b via message 319. On validation of the Token B, the service B 203 delivers service content to the user 201. This step enables, for instance, the merchant user 201 who was initially signed on to Service A portal 205a to access content, functions, applications, etc. from the Service B portal 205b.

In one embodiment, the Service B 203b can created a federated account (e.g., a shadow account) for the user based on, for instance, a username and the Token A or Token B instead of an explicit password or other credential. In addition, the Service B 203b may prompt the user 201 to create full account with the Service B 203b. In one embodiment, creating the full account is based on the additional step of adding a password or other credentials to the shadow account. In some embodiments, the user 201 may also be asked to agree to terms and conditions specific to Service B 203b to create the full account. By way of example, upgrading the shadow account to a full account by providing specific credentials can assist service providers to retain users in the event that either service decides to discontinue a relationship that shares a federated identity for the user 201.

One creating of the either the shadow account, federated account, full account, etc., the user 201 can move back and forth between Service A 203a and Service B 203b, while signing in from either service using the same, original credentials (e.g., the federated identity).

Figure 4:
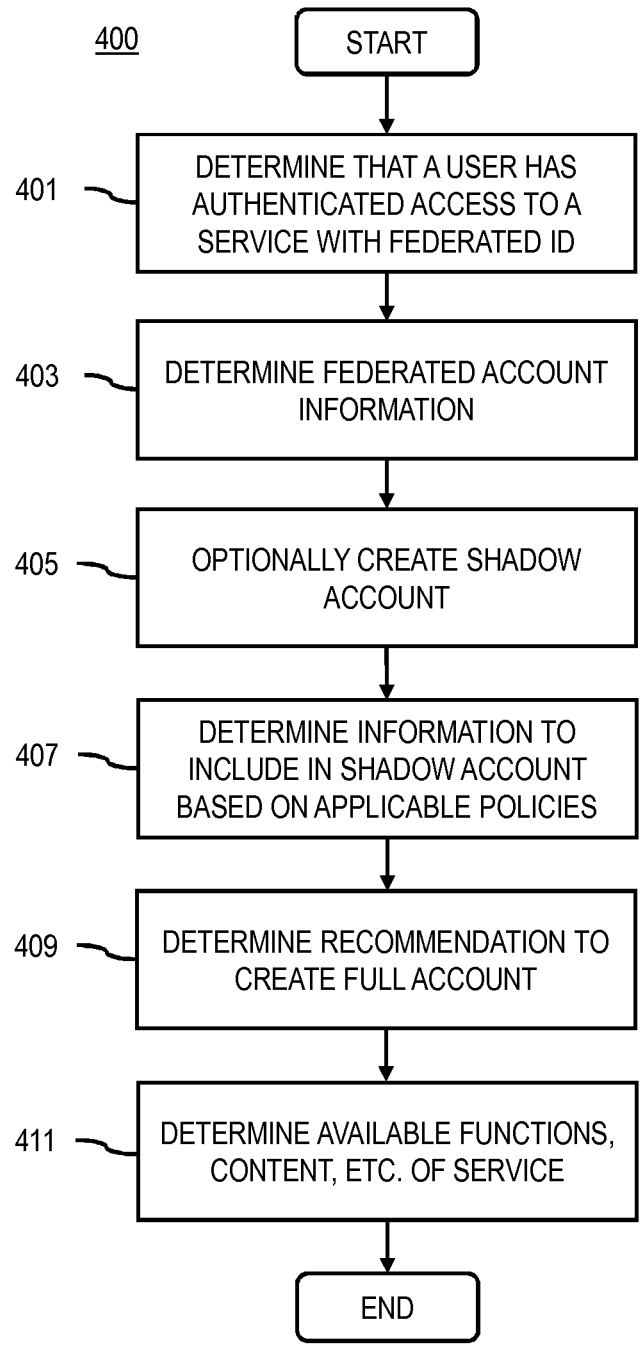
FIG. 4 is a flowchart of a process for providing federated service accounts, according to one embodiment.
Figure 11:
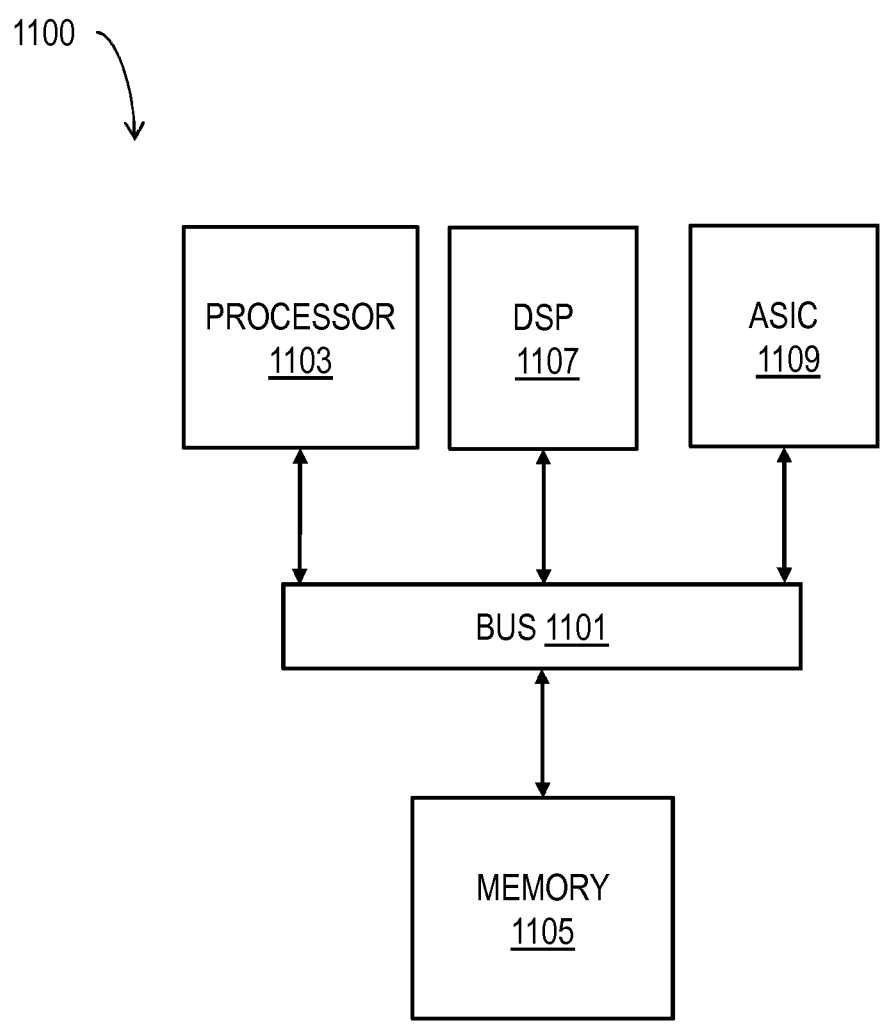
FIG. 11 is a diagram of a chip set that can be used to implement an embodiment of the invention.

FIG. 4 is a flowchart of a process for providing federated service accounts, according to one embodiment. In one embodiment, the federated account platform 115 performs the process 400 and is implemented in, for instance, a chip set including a processor and a memory as shown in FIG. 11. In addition or alternatively, ID federation gateway 140 may perform all or a portion of the process 400.

In step 401, the federated account platform 115 determines that a user has authenticated an access to at least one service using a federated identity, wherein the federated identity is associated with the at least one service, at least one or more other services, or a combination thereof. The federated account platform 115 then determines federated account information associated with the user based, at least in part, on one or more user accounts associated with the federated identity, the at least one service, the at least one or more other services, or a combination thereof (step 403). In one embodiment, the federated account information, the one or more user accounts, or a combination thereof include, at least in part, billing information, payment information, or a combination thereof for the user.

In step 405, the federated account platform 115 causes, at least in part, a creation of at least one shadow account based, at least in part, on the federated account information. In one embodiment, the at least one shadow account associates the user with respective one or more of the at least one service, the at least one other service, or a combination thereof. By way of example, the federated account platform 115 may determine at least a portion of the federated account information, the one or more user accounts, or a combination thereof to include in the at least one shadow account based, at least in part, on one or more privacy policies, one or more security policies, or a combination thereof associated with the at least one service, the at least one other service, or a combination thereof (step 407).

In step 409, the federated account platform 115 determines to generate at least one recommendation for a conversion of the at least one shadow account to at least one full account associated with the at least one service, the at least one other service, or a combination thereof. In one embodiment, the federated account platform 115 can cause, at least in part, an association of the at least one full account with the federated identity. To create the full account, the federated account platform 115, can cause, at least in part, a generation of a request for user authentication credentials for the at least one full account, wherein the user authentication credentials are specific to the at least one full account. In this way, the federated account platform 115 can cause, at least in part, an authentication to the at least one full account based, at least in part, on at least one authentication token associated with the federated identity, the user authentication credentials or a combination thereof.

In step 411, the federated account platform 115 determines one or more functions of the at least one service, the at least one or more other services, or a combination thereof to make available to the user based, at least in part, on the federated account information. In one embodiment, the federated account platform 115 determines to provide a differentiated access to the at least one service, the at least one other service, or a combination thereof based, at least in part, on whether the user authenticates via the at least one shadow account, the at least one full account, or a combination thereof.

In another embodiment, the federated account platform 115 may use "just-in-time" account federation. For example, the federated account platform 115 determines a request by the user for another access to the one or more functions, wherein the request relies, at least in part, on the billing information, the payment information, or a combination thereof. The federated account platform 115 then determine to make at least a portion of the billing information, the payment information, or a combination thereof available to the at least one service, the one or more other services, or a combination thereof on the determining or receiving the request for access to the at least one service.

In another embodiment, the federated account platform 115 may maintain separate accounts for non-billing account information and corresponding billing accounts for billing/payment account information. For example, the federated account platform 115 can determine to include the billing information, the payment information, or a combination thereof in at least one billing account associated with the user, the federated identity, the at least one service, the at least one other service, or a combination thereof.

Figure 5:
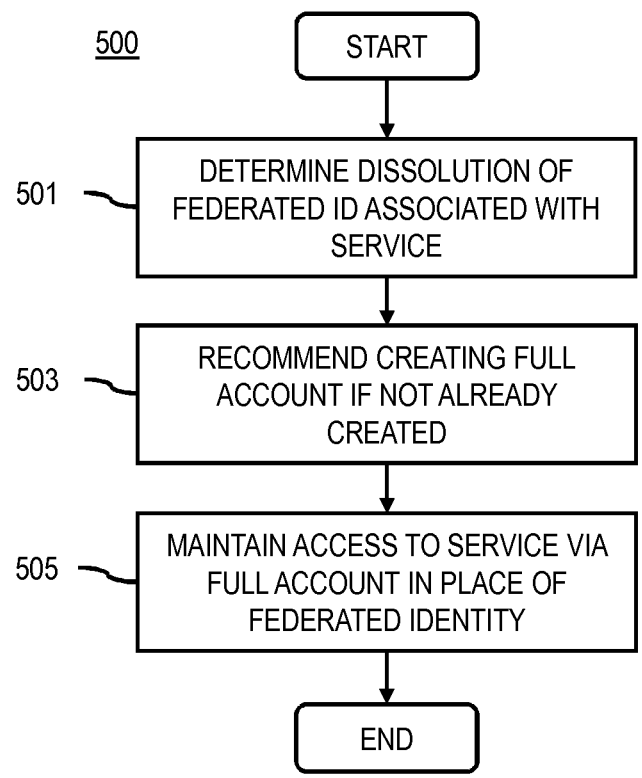
FIG. 5 is a flowchart of a process for maintaining user accounts after dissolution of a identity federation among multiple services, according to one embodiment.

FIG. 5 is a flowchart of a process for maintaining user accounts after dissolution of an identity federation among multiple services, according to one embodiment. In one embodiment, the federated account platform 115 performs the process 500 and is implemented in, for instance, a chip set including a processor and a memory as shown in FIG. 11. In addition or alternatively, ID federation gateway 140 may perform all or a portion of the process 500.

In step 501, the federated account platform 115 determines a dissolution of the federated identity. For example, a dissolution may occur when federated services decide to end their relationships or when a user decides to delete or eliminate a federated identity. In one embodiment, on determining the a request for dissolution and before the dissolution is complete, the federated account platform 115 can recommend to affected users to convert any existing shadow accounts for affected services to full accounts (step 503). In this way, the affected services may retain relationships with users even after the dissolution. Accordingly, in step 505, the federated account platform determines to maintain access to the one service, the at least one other service, or a combination thereof via the at least one full account.

The federated account platform 115 and ID federation gateway 140 communicates with authentication client module 122 and legacy authentication service and federated identity services using one or more messages described in the processes of FIGS. 6A through 9.

In another embodiment, the federated account platform 115 can also perform a process to facilitate sharing of portions of user data contained with service accounts of federated services. By way of example, user data may include user profile information (e.g., contact information, identity, user history, etc.) as well as other potentially sensitive information (e.g., billing information, payment information, etc.). In one embodiment, the user data can be partitioned into at least a restricted portion and an unrestricted portion. Accordingly, in one step, the federated account platform 115 processes and/or facilitates a processing of user data associated with at least one service to determine a restricted portion of the user data, an unrestricted portion of the user data, or a combination thereof, wherein the at least one service is associated with at least one other service via a federated identity.

In one embodiment, the restricted portion refers for instance to any portion of the data that is subject to limited sharing among the services, whereas unrestricted data can be shared freely among the services. For example, a user may consent to share the user's online username freely among the services, but may not consent to sharing his real name, billing information, etc. In one embodiment, the restricted portion may include, for instance, billing information, payment information, or a combination thereof. In addition, the federated account platform 115 may determine the restricted portion, the unrestricted portion, or a combination thereof based, at least in part, on user input, one or more privacy policies, one or more security policies, one or more standards, or a combination thereof. For example, on creating a federated identity, a user may be asked to specify what portion of the user's account data or information should be designated as restricted or unrestricted.

Once, the federated account platform 115 determines the restricted and/or unrestricted portions, the platform 115 may initiate sharing of the unrestricted platform, for instance, to facilitate creation of a shadow account in a partner service or portal. Next, depending on implementation and/or other criteria, the federated account platform 115 can initiate a transmission of the restricted portion from the at least one service to the at least one other service based, at least in part, on a triggering event associated in the at least one other service.

By way of example, the triggering event includes, at least in part, a request to access, to purchase, or a combination thereof one or more functions, one or more content, or a combination thereof associated with the at least one other service. In other words, the triggering event support a "just-in-time" model for sharing of the restricted content, whereby the restricted information is shared when needed by a partner service. In one embodiment, the federated account platform 115 and/or the partner service or portal can create a temporary account, a permanent account, or a combination thereof in the at least one other service based, at least in part, on the transmission of the restructured portion. For instance, in one embodiment, the restricted information may be retained by the partner service only for the purpose and/or duration of completing a request function, transaction, etc.

In another embodiment, the partner service may created a permanent billing account to maintain a more permanent relationship with the user 201 or as allowed by agreement among the services, user preferences, policies, standards, etc. In addition, in one embodiment, the federated account platform 115 may determine when there are one or more updates to the restricted portion, the unrestricted portion, or a combination thereof in the at least one service, the at least one other service, or a combination thereof. If any updates are determined, the federated account platform 115 causes, at least in part, a synchronization of the one or more updates to the at least one service, the at least one other service, or a combination thereof.

Figure 6A:
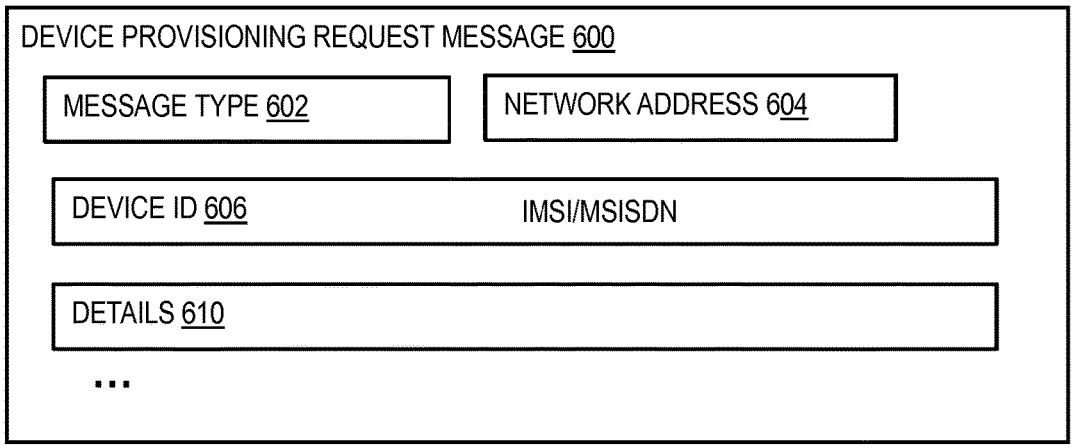
FIG. 6A is a diagram of a device provisioning request message, according to one embodiment.

FIG. 6A is a diagram of a device provisioning request message 600, according to one embodiment. Provisioning request message 600 includes a message type field 602, a network address field 604, a device identifier (ID) field 606 and one or more details fields 610. The message type field 602 hold data that indicates the message is a device provisioning request message sent by the authentication client module 122 to determine how to deal with user identification processes. The network address field 604 holds data that indicates the network address of the authentication client module 122, to which a response to the request should be sent.

The device ID field 606 holds data that uniquely indicates user equipment, such as a Mobile Subscriber Integrated Services Digital Network Number (MSISDN, which is a cell telephone number) or some other identifier defined by an access provider, such as an International Mobile Subscriber Identity (IMSI) identifier, a unique 15-digit code used to identify an individual user on a global system for mobile communications (GSM) network. These options are indicated by the symbols "IMSI/MSISDN" in field 606. An IMSI value is typically stored on a Subscriber Identity Module (SIM card), a device used to store information in many mobile phones, especially for advanced features. While the IMSI indicates a user who is supposed to control a mobile UE, it is not a guarantee that the correct user is actually in control of the mobile UE. Thus user authentication, e.g., involving entry of a password, is still desirable during identification.

The details field 610 holds further details about the UE or user, such as features available on the UE like operating system, applications such as global positioning system (GPS), and Bluetooth capabilities, among many others well known in the art. In some embodiments, field 610 is omitted.

In some embodiments, authentication client module 122 uses request message 600 to request identity provisioning data from a network component, when UE 101 is powered up. In some embodiments, the authentication client module 122 includes detailed information in details field 610 in the provisioning request message 600 in order to fine grain data returned by a provisioning service.

Figure 6B:
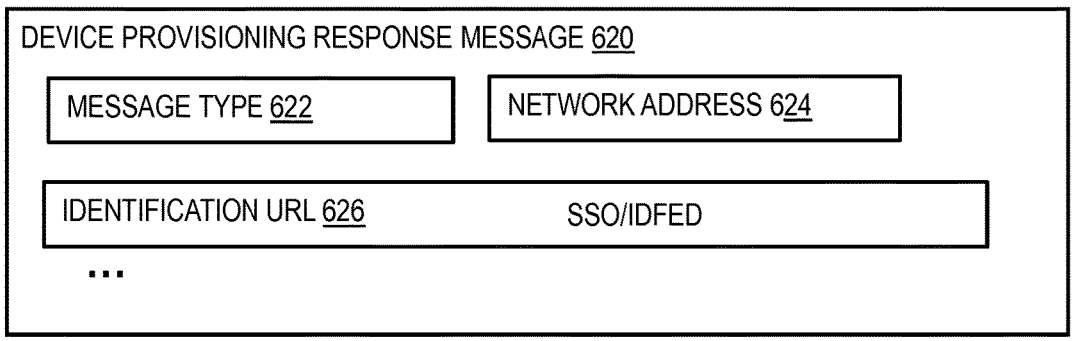
FIG. 6B is a diagram of a device provisioning response message, according to one embodiment.

FIG. 6B is a diagram of a device provisioning response message 620, according to one embodiment. Device provisioning response message 620 includes a message type field 622, a network address field 624 and an identification URL field 626. The message type field 622 holds data that indicates the message is a device provisioning response message sent to the authentication client module 122 by the ID federation gateway 140 to indicate how to deal with user identification. The network address field 624 holds data that indicates the network address of the ID federation gateway 140.

The identification URL field 626 holds data that indicates a service and service parameters to use when a user attempts to obtain a network resource that involves user identification. A URL with associated parameters is easily sent in an HTTP message used by browser 107 and many clients of services 110, such as client 114. In some embodiments, at least one parameter for the URL in field 626 indicates whether the user of the user equipment is to be identified employing the legacy authentication service 9 such as an SSO service) or with the federated identity service, such as indicated by the symbols "SSO/IDFED" in field 626.

In some embodiments, provisioning data is pushed to authentication client module 122 on a mobile terminal, for example in a device provisioning response message 620 sent automatically to every mobile terminal that connects to a network, such as communications network 105, e.g., based on an MSISDN value presented during communication, without requiring a device provisioning request message 600.

Figure 6C:
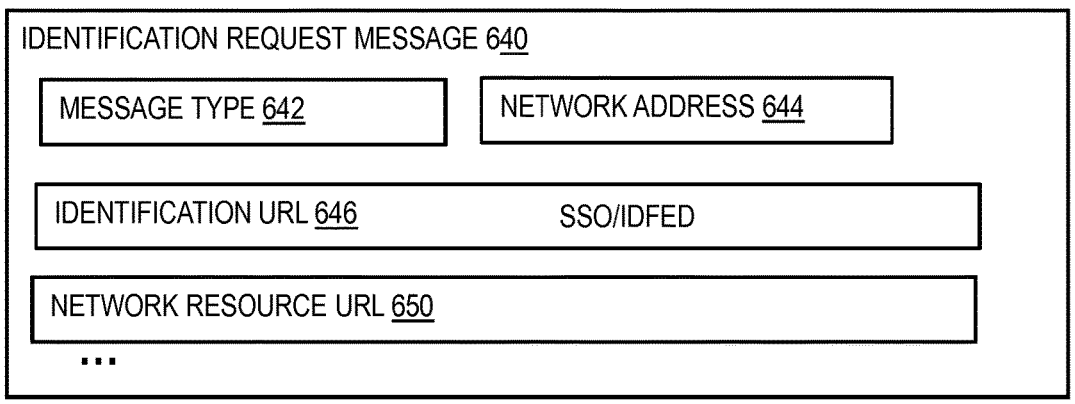
FIG. 6C is a diagram of an identity authentication request message for a network resource, according to one embodiment.

When the authentication client module 122 detects a request for a resource of a resource provider, an authentication request message is sent to the URL with parameters provided in field 626. FIG. 6C is a diagram of an identification request message 640 for a network resource, according to one embodiment. Identification request message 640 includes a message type field 642, a network address field 644, an identification URL field 646 and one or more network resource URL fields 650. The message type field 642 holds data that indicates the message is an identification request message sent by the authentication client module 122. The network address field 624 holds data that indicates the network address of the authentication client module 122. The identification URL field 646 holds the data provided in field 626 with any parameters, such as the indication whether the authentication is done by the legacy authentication service or the federated identity service, e.g., access provider identification service 130.

The network resource URL field 650 holds data that indicates the network resource, e.g., service 110, for which the user desires to sign on.

Figure 7A:
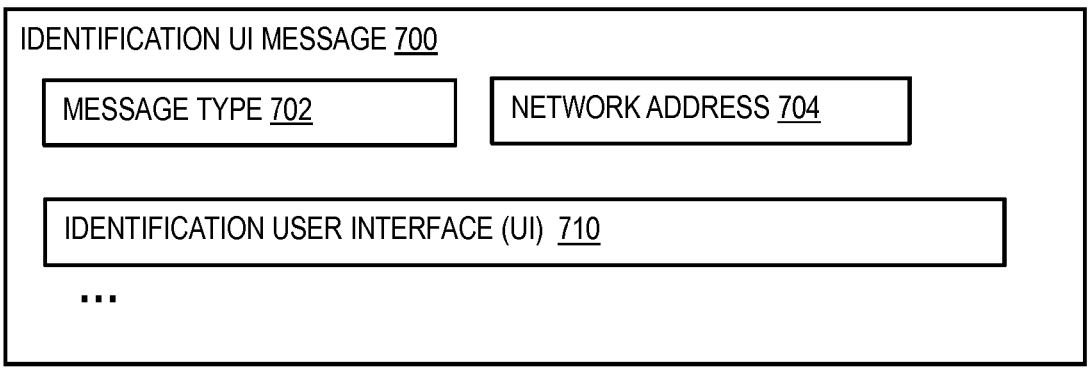
FIG. 7A is a diagram of an authentication user interface (UI) message, according to one embodiment.

In various embodiments, the ID federation gateway 140 prompts the user for input, such as user name and password, to determine whether a user of UE 101 is authentically a particular user registered with one or more network resources. The prompts are presented on the UE 101 in one or more user interfaces (UIs). FIG. 7A is a diagram of an identification user interface (UI) message 700, according to one embodiment. The identification UI message 700 includes a message type field 702, a network address field 704 and an identification UI field 710. The message type field 702 holds data that indicates the message is an identification UI message sent to the authentication client module 122. The network address field 704 holds data that indicates the network address of sending process, e.g., ID federation gateway 140.

The identification UI field 710 holds data that indicates the UI to be presented to the user, e.g., the user of UE 101. In some embodiments, the identification UI field 710 includes data that is to be presented to the user, such as script for a form in an HTML document sent via HTTP, as is well known in the art. In some embodiments, the identification UI field 710 includes data that redirects a client to the federated identity service, such as access provider identification service 130. Any method may be used to cause the client process to be redirected, such as a redirect URL in an HTML document sent via HTTP to client 114 or browser 107, as is well known in the art. The URL includes one or more parameters that cause the federated identity service to present an identification UI at the user equipment. The user inputs to the UI are returned to the federated identity service. In some embodiments, the redirect URL in the identification UI field 710 includes data that causes the response from the federated identity service to be sent to the ID federation gateway 140, either directly or indirectly by a redirect in a response sent from the federated ID service to the user equipment.

Figure 7B:
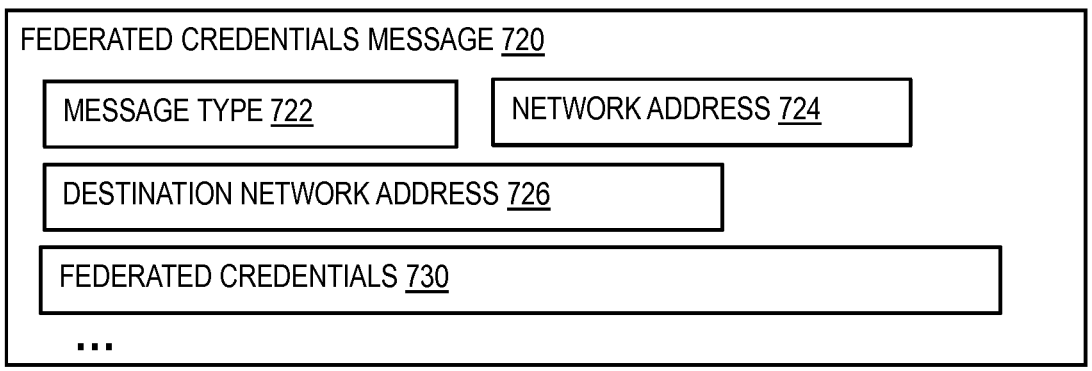
FIG. 7B is a diagram of a user credentials message, according to one embodiment.

As a result of receiving user input prompted by the identification UI, the federated identity service determines whether the user is successfully identified or not; and returns the result in a federated credentials message. FIG. 7B is a diagram of a federated credentials message 720, according to one embodiment. The federated credentials message 720 includes a message type field 722, a network address field 724, a destination network address field 726 and a federated credentials field 730. The message type field 722 holds data that indicates the message is a federated credentials message sent by the federated identity service. The network address field 724 holds data that indicates the network address of sending process, e.g., federated identity service such as access provider identification service 130. The destination network address field 726 holds data that indicates the network address of the destination. In some embodiments, the destination is a URL for the browser 107 or client 114 with a redirect to the ID federation gateway 140. In some embodiments, the destination is a URL for the ID federation gateway 140 directly.

The federated credentials field 730 holds data that indicates the result from the federated identity services authentication process. If authentication failed, the result is a failure code indicating a reason for failure (e.g., unknown user name, incorrect password, negative account balance, among others). If authentication succeeded, the result is a token that indicates the user (and in some embodiments other data such as time) with some security code, such as a digital signature, that can be checked using a shared secret or public key for the federated identity service, as is well known in the art. The security code indicates that the token indeed came from the federated identity service. The user is indicated by a code that is shared among all members of the ID federation, including the provider of services 110. Thus, successful authentication by third party federated identity service, e.g., access provider identification service 130, redirects authentication client module 122 back to ID federation gateway 140 with proof of successful authentication (token).

Figure 7C:
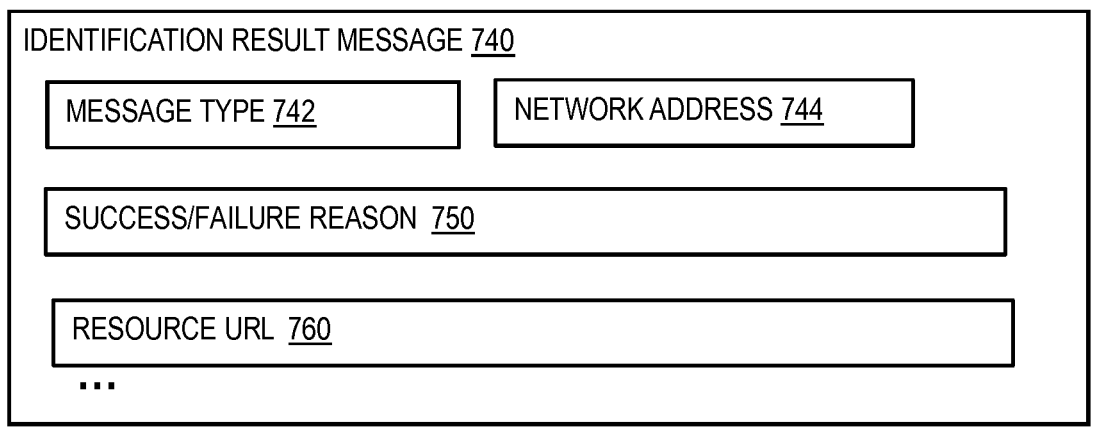
FIG. 7C is a diagram of an identity authentication result message, according to one embodiment.

After the ID federation gateway 140 receives the federated credential message 720 and exchanges messages with the legacy authentication service based on the federated credentials, the gateway 140 sends an authentication result message to the user, e.g., to the authentication client 122 which presents the result to the user. FIG. 7C is a diagram of an identification result message 740, according to one embodiment. The identification result message 740 includes a message type field 742, a network address field 744, a success/failure reason field 750, and a resource URL field 760. The message type field 742 holds data that indicates the message is an identification result message sent by the ID federation gateway 140. The network address field 724 holds data that indicates the network address of the sending process, e.g., ID federation gateway 140.

The success failure reason field 750 holds data that indicates the result from the identification process. If identification failed, the result is a failure code indicating a reason for failure (e.g., unknown user name, incorrect password, negative account balance, among others). If identification succeeded, the data indicates success. In some embodiments, if identification is successful, then the field 750 includes a token from the legacy authentication system.

The resource URL field 760 holds data that indicates the URL of the resource with any parameters, including any parameters granting access such as an authentication token, if the result in field 750 indicates a success. Otherwise, the field 760 is empty or omitted.

Although messages in FIG. 6A through FIG. 7C are shown as integral blocks with particular fields in a particular order for purposes of illustration, in other embodiments one or more fields or portions thereof occur in a different order in one or more messages, or are omitted, or one or more fields are added or the message is changed in some combination of ways. For example, in some embodiments, the message type fields and network address fields are included in one or more header portions of one or more protocols used to deliver the message through the network, e.g., through communications network 105.

Figure 10:
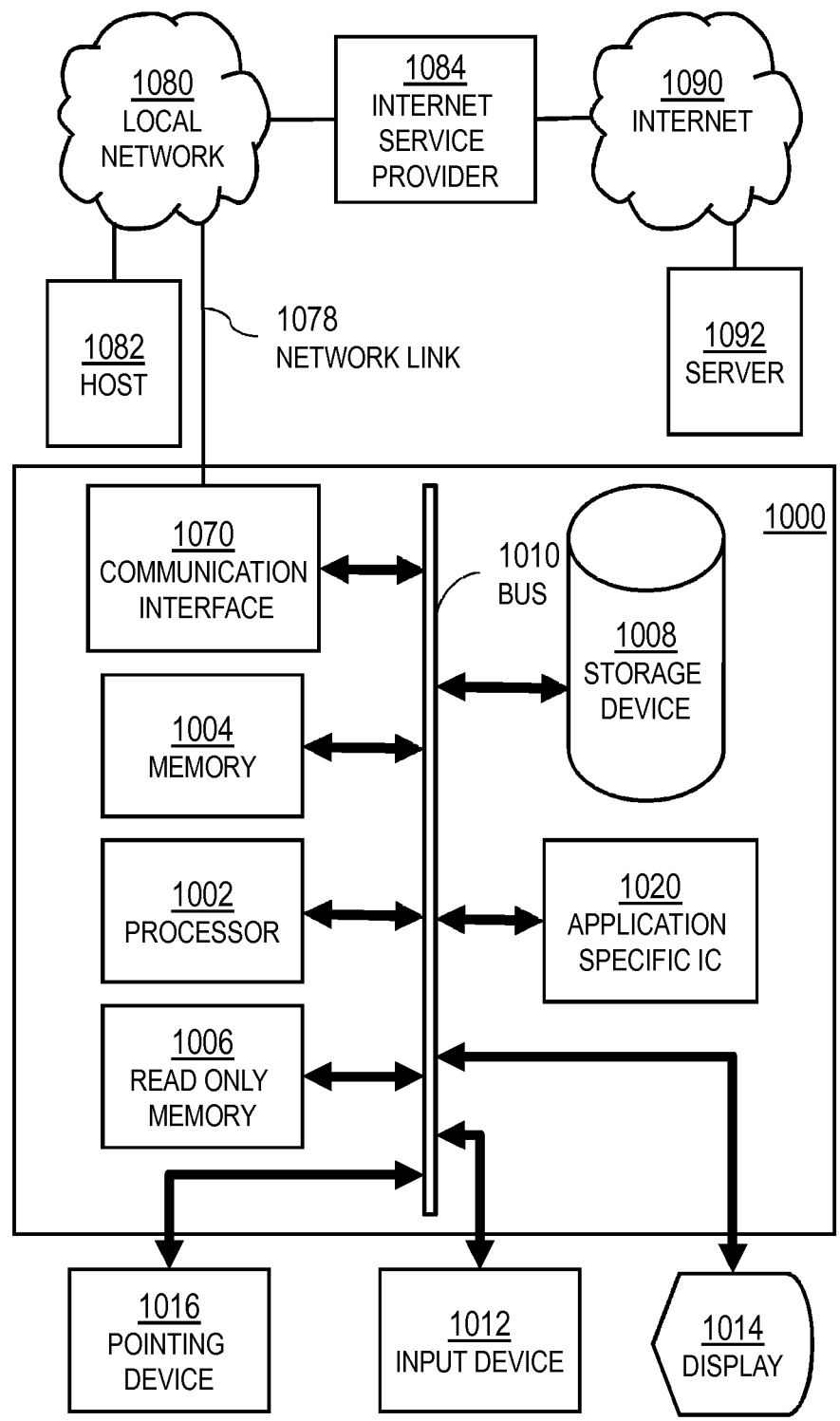
FIG. 10 is a diagram of hardware that can be used to implement an embodiment of the invention.

FIG. 8 is a flowchart of a process 800 for an identifier (ID) federation gateway 140, according to one embodiment. In one embodiment, the ID federation gateway 140 is implemented in, for instance, a chip set including a processor and a memory as shown FIG. 11, or a general purpose computer as shown in FIG. 10. In some embodiments, the process 800 is performed by a remote server, and a method comprises facilitating access, including granting access rights, to an interface to allow access to a service of the remote server via a network. Although steps are shown in flowcharts such as FIG. 8 as integral blocks in a particular order for purposes of illustration, in other embodiments one or more steps or portions thereof are performed in a different order or overlapping in time, in series or parallel, or are omitted or one or more steps are added, or the method is changed in some combination of ways.

In step 801, a provisioning request is received from user equipment to determine how to perform identification for a user of the equipment. For example, a request for provisioning data from a network component is sent as message 600 by the authentication client module 122 on UE 101 to the legacy authentication service and intercepted by the ID federation gateway 140 executing on the same host with the legacy authentication service. Thus, an initial message directed to the single sign-on process of the provider is caused to be diverted away from the single sign-on process to the gateway 140 during step 801. In some embodiments, an initial request for one of the network resources offered by the network resource provider, e.g., an initial request for one or more of services 110, serves as the provisioning request received in step 801. In some embodiments, step 801 determines when the user equipment connects to the network.

In step 803, it is determined whether the user equipment is subject to identification by a federated identity service or not. Any method may be used to determine this, such as parsing the initial message 600 to determine the user equipment indicated in device ID field 606. For example, the contents of the device ID field 606, such as a MSISDN value, are compared to a network database that indicates the access provider for the user equipment. If the access provider is a member of an identity federation, then the federated identity service for the access provider is determined Thus, in some embodiments, a database is used for determining user equipment associated with identification by the different party, e.g., by the federated identity service. If not, and there is no other member of an identity federation associated with the device ID data in field 606, then it is determined to use the internal authentication service to identify and authenticate the user. Thus step 803 determines whether a user associated with a request for a particular network resource is to be identified by the provider of the particular service or by a different party. This provides the advantage of abstracting the third party interactions out of the legacy system, such as the legacy authentication service and the services 110. This abstraction provides the advantage of reducing the computational resources to update and integrate the third party interactions into the legacy authentication service and services 110. Step 803 is an example means of achieving this advantage.

In step 805 a device provisioning response message, such as message 620, is sent to the user equipment, e.g., to the authentication client module 122 on UE 101. The response message includes data that indicates the identification process determined in step 803, e.g., inserted in field 626. For example, the URL of the ID federation gateway 140 with at least one parameter is inserted into identification URL field 626 of message 620. The at least one parameter indicates legacy authentication service if there is no federated identity service. The parameter indicates the federated identity service if there is one, as determined in step 803. In some embodiments, the URL of the authentication service is inserted into field 626 if there is no federated identity service; and the URL of the ID federation gateway 140 with a parameter indicating the federated identity service is inserted into field 626 if there is a federated identity service. This further abstracts the third party interactions and achieves the advantage of reducing the computational resources to update and integrate the third party interactions into the legacy authentication service and services 110. Step 805 is an example means of achieving this advantage. Thus, if the user equipment connects to the network, then provisioning data that indicates the different party is caused to be sent to the user equipment. By sending the provisioning message to the authentication client 122, the provisioning data is included in the request for the particular service, as described in more detail below.

In step 807 a request is received from user equipment to access a network resource that involves a user identity, e.g., one or more of services 110. For example, identification request message 640 is received indicating the network resource to be accessed in field 650 and the identification URL in field 646. The data in field 646 indicates whether identification is to be done using an internal system, such as the legacy SSO, or a federated identity service, such as access provider identification service 130.

In step 809 it is determined whether an internal authentication system is to be used, such as legacy SSO service. For example, this determination is made based on the contents of field 646. If so, then in step 811 the request for access is passed to the internal system, e.g., the legacy SSO service, as described above with reference to FIG. 1. If not, then a third party, i.e., a federated identity service, is to identify a user; and control passes to step 813. Thus step 809 is a means for causing the different party to provide identification data that indicates an identity for the user, if the user is to be identified by the different party. This further abstracts the third party interactions and achieves the advantage of reducing the computational resources to update and integrate the third party interactions into the internal authentication service and network services 110. Step 809 is an example means of achieving this advantage.

In step 813, it is determined whether the identification user interface (UI) is to be provided by the third party, i.e., the federated identity service. If so, then in step 815, the process on the user equipment, e.g., authentication client module 122, is redirected to the third party. For example, message 700 is sent to the user equipment with a redirect to the federated identity service in field 710. In some embodiments, the redirect includes data so that the response is redirected to the ID federation gateway 140, as described below. Thus, in some embodiments, step 815 includes forming a redirected request that is redirected to the different party and includes a separate redirect of a response from the different party to the service; and causing the redirected request to be sent to the user equipment.

Furthermore, step 815 is an example means for causing a different party from the resource provider to provide identification data that indicates an identity for the user. Step 815 achieves the advantage of using the third party identification without changing the legacy internal authentication service or services 110, thus saving computational resources on the hosts of those services. This also achieves the advantage of using the UI provided by the third party, thus saving computational resources on the legacy authentication service. Thus steps 813 and 815 are example means for achieving this additional advantage.

If it is determined in step 813 that the third party does not provide the UI, then in step 817, an identification UI, also called a logon UI for convenience hereinafter, is sent to the user equipment. For example, message 700 is sent to the user equipment with a script for the logon UI in field 710. Thus step 817 includes causing to be sent, to the user equipment, a user interface that presents prompts for input from a user for the different party to identify the user.

In step 819 it is determined whether a response is received from the user equipment with user input. If no response is received within a reasonable time, e.g., within five minutes, then logon fails and control passes to step 829. In some embodiments, step 815 returns only a user response to the UI sent by the third party and not an identification result, such as a token or failure code. In such embodiments, the user responses from step 815 are returned to step 819, as indicated by the dashed arrow.

In step 829 a failure notice is sent to the user equipment. The failure reason is presented on a display of the user equipment, e.g. on a display of UE 101 by authentication client module 122; and the process ends. For example, message 740 is sent to authentication client module 122 with data in field 750 indicating a failure for lack of user input.

If it is determined, in step 819, that a response is received from the user equipment with user input within an appropriate time, then in step 821 data indicating the user response is sent to the third party, i.e., to the appropriate federated identity service. Thus step 821 includes causing to be sent, to the different party, data based on user responses to the prompts of the user interface. This is one means for causing the different party to provide identification data that indicates an identity for the user and achieves the advantage of using the federated identity service without changing the rest of the legacy authentication service. In some embodiments, this takes place offline e.g. by utilizing digital signatures (which involves a trusted relationship between the ID federation gateway 140 and the federated identity service, e.g., access provider identification service 130).

In step 823, it is determined whether the third party has successfully identified the user. For example, as a result of step 815 or 821, the user credential message 720 is received at the gateway 140 from the third party. Thus step 823 includes receiving identification data in response to step 815 (sending to the user equipment a redirected request that is redirected to the different party); and receiving the identification data in response to step 821 (sending to the different party the data based on user responses to the prompts of the user interface). The message 720 is parsed to determine whether identification information, such as field 730, indicates a valid token. If field 730 does not include a valid token, then user identification is a failure; and control passes to step 829, described above. In step 829, data in field 750 indicates a failure code for an invalid token or other failure code from field 730, and is sent to the user equipment for presentation to a user.

If it is determined, in step 823, that the user is successfully identified by the third party, then, in step 825, data indicating the user credentials based on the valid token are sent to the internal system, e.g., the legacy SSO service. The user credentials are based on the identification information sent by the third party in field 730 of message 720. Thus, if the data indicates that the user is successfully identified, then user credentials data based on the identification data are caused to be sent to an authentication process, such as a single sign-on process, of the provider. This provides the advantage of using the legacy authentication or SSO service when no federated identity service is available so that redundant processing is avoided for signing on to any or all of the services 110 of the network resource provider.

In step 827, it is determined whether the user is successfully signed on to the legacy authentication system, e.g., SSO service. The valid token provided by the third party service might not indicate a registered user of the services 110 provided by the network resource provider, e.g., OVI. The result of the internal system is provided as a returned call parameter in an application programming interface (API) or a client-server message, such as an HTTP message. In some embodiments, successful identification on the legacy SSO returns an SSO token. If it is determined in step 827 that the user is not successfully signed on to the internal system, then control passes back to step 829 to send to the user equipment a failure notice with the reason for failure, as described above.

If it is determined in step 827 that the user is successfully signed on to the internal system, then in step 831 access is granted to the network resource, such as one or more of services 110, and a notice of success is sent to the user equipment. Thus the ID federation gateway 140 utilizes core authentication service to create a transparent system wide authentication context with an authentication token. In some embodiments, the notice of success is a message sent to authentication client module 122 for presentation on a display of user equipment, such as UE 101. In some embodiments, the notice of success is an opening page of the network resource, such as a home Web page of service 110 sent as an HTML document in an HTTP message.

Figure 9:
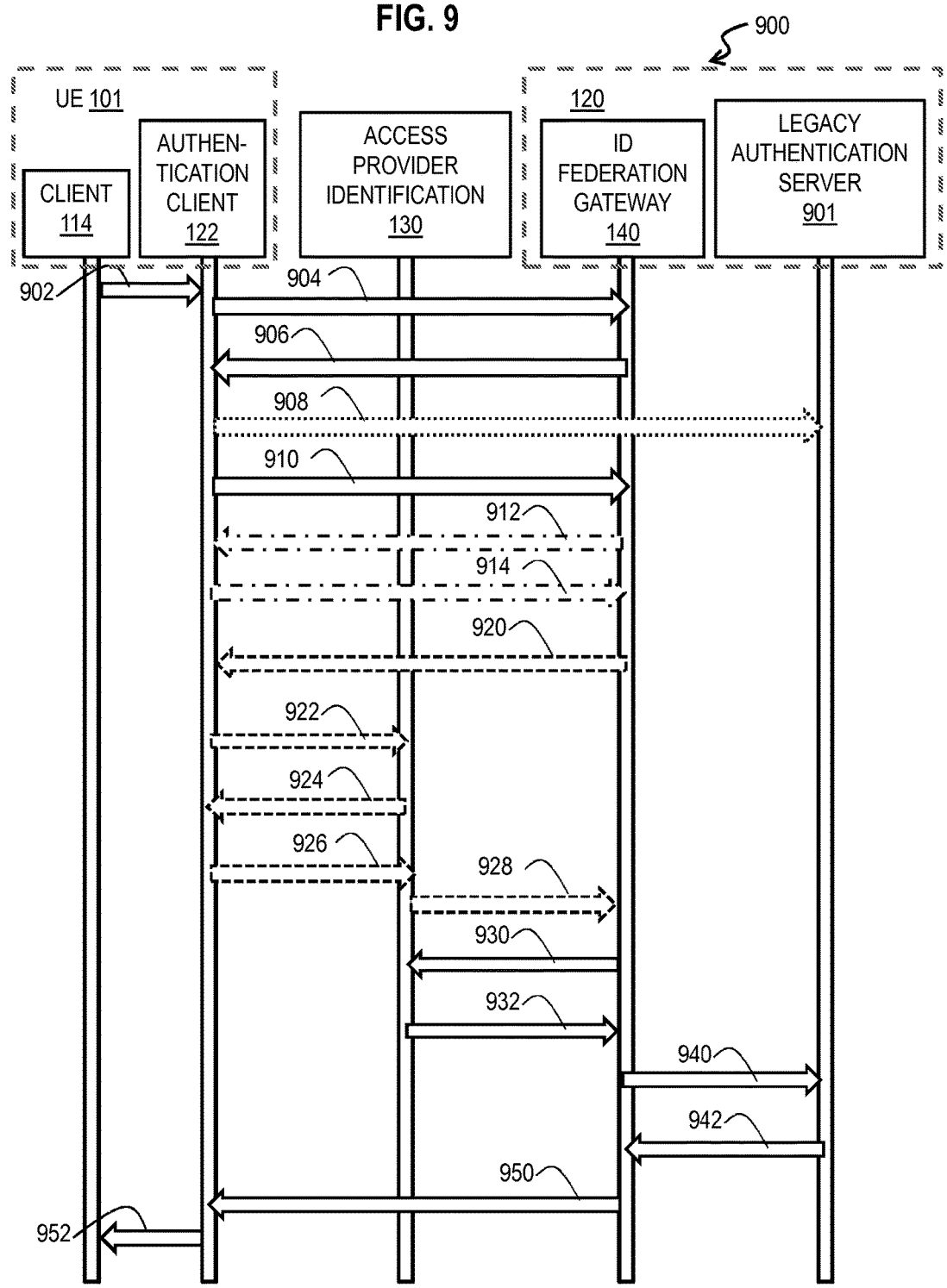
FIG. 9 is a time sequence diagram that illustrates a sequence of messages and processes for an ID federation gateway, according to various embodiments.

FIG. 9 is a time sequence diagram that illustrates a sequence of messages and processes for an ID federation gateway, according to various embodiments. A network process on the network is represented by a thin vertical box, labeled at the top. A message passed from one process to another is represented by horizontal arrows. A step performed by a process is indicated by a box or looping arrow overlapping the process at a time sequence indicated by the vertical position of the box or looping arrow.

The processes represented in FIG. 9 are services client 114 and authentication client module 122 in UE 101, an access provider identification service 130 (as an example federated identity service), and an internal authentication service 120 comprising an ID federation gateway 140 and a legacy authentication service 901 (such as a legacy SSO).

A request message 902 is sent from client 114 (or browser 107) to access a resource, such as service 110, from a network resource provider. The authentication client 122 intercepts the request message to direct it to an appropriate user identification process. To determine the appropriate identification process for the UE 101, the authentication client 122 sends a provisioning message 904, such as message 600, to a default network component, such as internal authentication service 120. The provisioning message identifies the UE 101 with as much detail as possible, such as with a MSISDN or IMSI or both. This message is intercepted by the ID federation gateway 140 to avoid modifications to the legacy authentication server 901.

The gateway 140 determines the appropriate identification process as described above with reference to step 803 in FIG. 8. The gateway 140 then sends a response message 906, such as message 620, that indicates the appropriated identification process, e.g., in identification URL field 626. The message is sent to UE 101 where it is received by authentication client 122.

In some embodiments, messages 904 and 906 are exchanged upon powering up UE 101, before message 902 is sent. In some embodiments, message 906 is pushed to UE 101 without waiting for request message 904.

Based on provisioning data and device information, authentication client 122 determines which identification process destination to send the request for service, either service request message 908 (such as message 640) directed to the legacy authentication 901, or request message 910 (such as message 640) directed to the ID federation gateway 140. The legacy authentication server operates in response to message 908 and is not described further herein. To indicate that the sequence associated with message 908 is not followed, the arrow representing message 908 is dotted.

In response to message 910, the ID federation gateway 140 sends an identification user interface (UI) to the client prompting user input, such as password or username and password or some other user input, for identifying the user. The UI is sent in an identification UI message 700. As described above, the identification UI message includes the UI, e.g., as a HTML script for presenting a form, in some embodiments, and includes the redirect to the federated identity service in other embodiments. The former embodiments include message 912 and 914 represented by dash-dot arrows; the latter embodiments include messages 920, 922, 924, 926 and 928 represented by dashed arrows, instead.

In the former embodiments, the ID federation gateway 140 is configured to present a UI to obtain the user inputs for the federated identity service, such as service 130. The message 912, such as identification UI message 700, includes in field 710 a UI that is associated with gateway 140. The UI may be included in any manner known in the art, such as a script in an HTML document delivered via HTTP. The UI in field 710 is directly presented on UE 101 by authentication client 122. User responses are returned in one or more messages 914.

In the latter embodiments, the ID federation gateway 140 is configured to redirect the user equipment to the federated identity service, such as service 130, which provides a UI to obtain user inputs, as described above with reference to step 815 in FIG. 8. The message 920, such as identification UI message 700, includes in field 710 a redirect that is associated with gateway 140. The redirect may be included in any manner known in the art, such as URL with one or more parameters. In an illustrated embodiment, the parameters redirect the UI response to the gateway 140. The authentication client 122 is redirected to the federated identity service, such as service 130, in message 922. A UI is sent from the federated identity service to the authentication client 122 in message 924 and presented on UE 101 by authentication client 122. User inputs are returned to the federated identity service in one or more messages 926 and redirected to the ID federation gateway 140 in message 928. In some embodiments, message 928 includes the identification information results produced by the service 130, such as a failure code or token indicating user credentials.

In response to user inputs received in message 914, or in message 928 when authentication results are not also available in message 928, the ID federation gateway 140 sends data indicating the user responses to the federated identity service, such as service 130, as described above with reference to step 821 in FIG. 8. In response to sending message 930, the federated identity service, such as service 130, sends identification results in message 932, such as user credential message 720. In some embodiments, message 928 includes an identification result; and messages 930 and 932 are omitted.

If the message 932 (or 928) includes a valid token, e.g., in user credential field 730, then user credentials for the legacy authentication service based on the valid token are sent to the legacy authentication service 901 in message 940. If the user credentials are deemed valid by the legacy authentication service 901, then the client 114 has gained access to one or more of the services 110. If not, then a failure condition has occurred. The response message 942 from the legacy authentication service 901 indicates the results, e.g., in field 750 of identification result message 740, as success or failure code. In some embodiments, if the result at the legacy authentication service 901 is a success, the message 942 includes the authentication token. Consequently, the ID federation gateway 140 is considered a trusted service; and service wide authentication context is created. In some embodiments, if the result at the legacy authentication service 901 is a success, the message 942 includes a URL with parameters that redirects the client 114 to the network resource, such as service 110, e.g., in field 760 with any credentials as parameters in the field.

At least some data from results message 942 are included in a message 950 from the ID federation gateway 140 to the authentication client 122, and thence to the client 114 (or browser 107) in message 952. In various embodiments, messages 942, 950, 952 are of the form of authentication results message 740.

Subsequent requests from browser 107 or clients of other services from the same user equipment during the same connection session with the network 105 are not presented with an identification UI, because both federated and authentication tokens are already available for this equipment at ID federation gateway 140.

The processes described herein for providing federated service accounts may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide federated service accounts as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing federated service accounts.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing federated service accounts. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing federated service accounts. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing federated service accounts, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing federated service accounts to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide federated service accounts as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing federated service accounts.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide federated service accounts. The memory 1105 also stores the data associated with or generated by the execution of the inventive steps.

Figure 12:
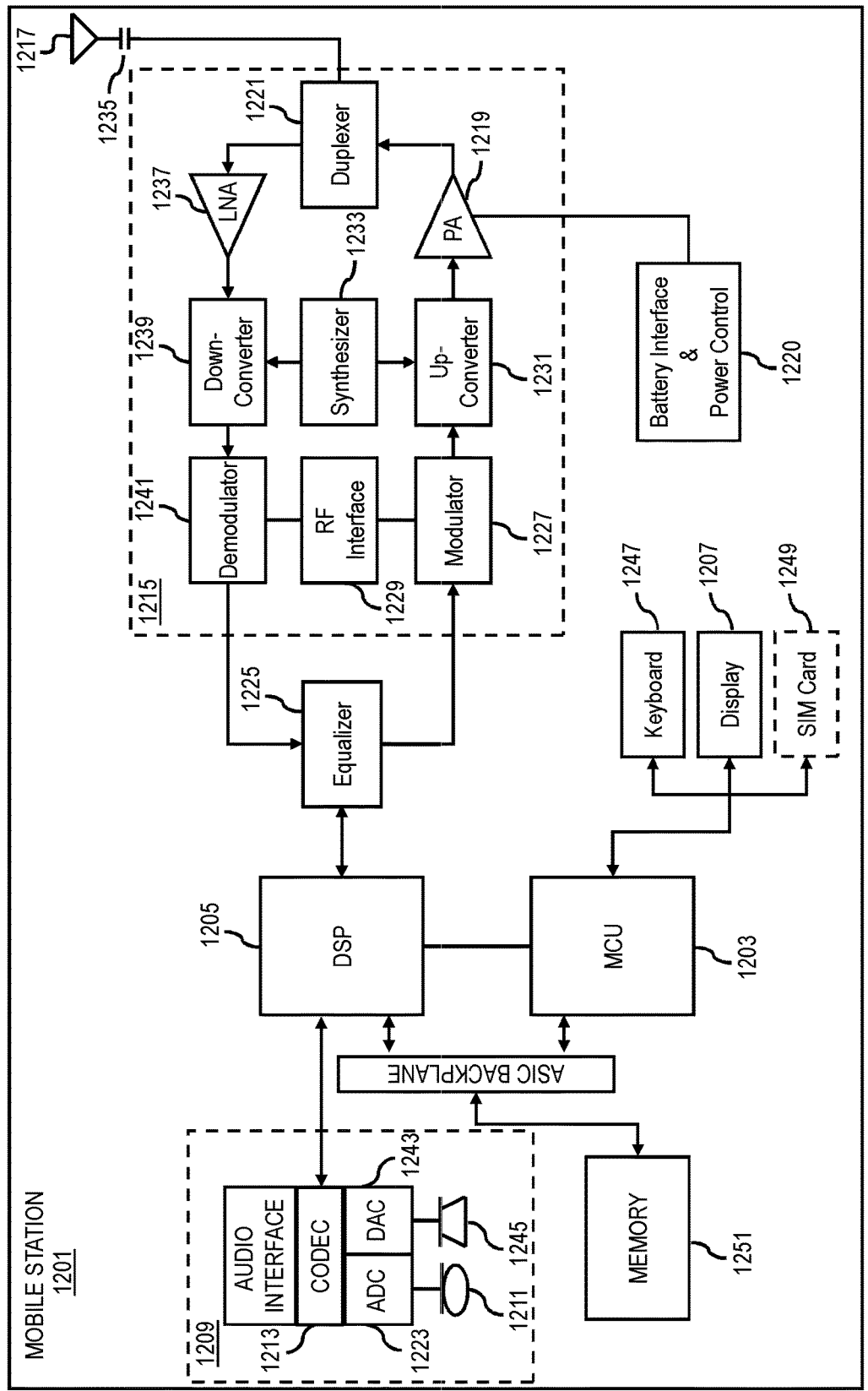
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing federated service accounts. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing federated service accounts. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide federated service accounts. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

CONCLUSION

Therefore, according to an embodiment, a method comprising facilitating a processing of and/or processing (1) data and/or (2) information and/or (3) at least one signal, the (1) data and/or (2) information and/or (3) at least one signal based, at least in part, on the following: at least one determination that a user has been authenticated for an access to at least one service using a federated identity, wherein the federated identity is associated with the at least one service, at least one or more other services, or a combination thereof at least one determination of federated account information associated with the user based, at least in part, on one or more user accounts associated with the federated identity, the at least one service, the at least one or more other services, or a combination thereof; and at least one determination of one or more functions of the at least one service, the at least one or more other services, or a combination thereof to make available to the user based, at least in part, on the federated account information.

According to one aspect of the embodiment, the (1) data and/or (2) information and/or (3) at least one signal are further based, at least in part, on the following: a creation of at least one shadow account based, at least in part, on the federated account information, wherein the at least one shadow account associates the user with respective one or more of the at least one service, the at least one other service, or a combination thereof.

According to one aspect of the embodiment, the (1) data and/or (2) information and/or (3) at least one signal are further based, at least in part, on the following: at least one determination of at least a portion of the federated account information, the one or more user accounts, or a combination thereof to include in the at least one shadow account based, at least in part, on one or more privacy policies, one or more security policies, or a combination thereof associated with the at least one service, the at least one other service, or a combination thereof.

According to one aspect of the embodiment, the (1) data and/or (2) information and/or (3) at least one signal are further based, at least in part, on the following: at least one determination to generate at least one recommendation for a conversion of the at least one shadow account to at least one full account associated with the at least one service, the at least one other service, or a combination thereof; and an association of the at least one full account with the federated identity.

According to one aspect of the embodiment, the (1) data and/or (2) information and/or (3) at least one signal are further based, at least in part, on the following: a generation of a request for user authentication credentials for the at least one full account, wherein the user authentication credentials are specific to the at least one full account; and an authentication to the at least one full account based, at least in part, on at least one authentication token associated with the federated identity, the user authentication credentials or a combination thereof.

According to one aspect of the embodiment, the (1) data and/or (2) information and/or (3) at least one signal are further based, at least in part, on the following: a dissolution of the federated identity; and at least one determination to maintain access to the one service, the at least one other service, or a combination thereof via the at least one full account.

According to one aspect of the embodiment, the (1) data and/or (2) information and/or (3) at least one signal are further based, at least in part, on the following: at least one determination to provide a differentiated access to the at least one service, the at least one other service, or a combination thereof based, at least in part, on whether the user authenticates via the at least one shadow account, the at least one full account, or a combination thereof.

According to one aspect of the embodiment, the federated account information, the one or more user accounts, or a combination thereof include, at least in part, billing information, payment information, or a combination thereof for the user.

According to one aspect of the embodiment, the (1) data and/or (2) information and/or (3) at least one signal are further based, at least in part, on the following: a request by the user for another access to the one or more functions, wherein the request relies, at least in part, on the billing information, the payment information, or a combination thereof; and at least one determination to make at least a portion of the billing information, the payment information, or a combination thereof available to the at least one service, the one or more other services, or a combination thereof on the determining of the request.

According to one aspect of the embodiment, the (1) data and/or (2) information and/or (3) at least one signal are further based, at least in part, on the following: at least one determination to include the billing information, the payment information, or a combination thereof in at least one billing account associated with the user, the federated identity, the at least one service, the at least one other service, or a combination thereof.

According to another embodiment, a method comprises facilitating a processing of and/or processing (1) data and/or (2) information and/or (3) at least one signal, the (1) data and/or (2) information and/or (3) at least one signal based, at least in part, on the following: a processing of user data associated with at least one service to determine a restricted portion of the user data, an unrestricted portion of the user data, or a combination thereof, wherein the at least one service is associated with at least one other service via a federated identity; and an initiation of a transmission of the restricted portion from the at least one service to the at least one other service based, at least in part, on a triggering event associated in the at least one other service.

According to one aspect of the embodiment, the triggering event includes, at least in part, a request to access, to purchase, or a combination thereof one or more functions, one or more content, or a combination thereof associated with the at least one other service.

According to one aspect of the embodiment, the restricted portion includes, at least in part, billing information, payment information, or a combination thereof.

According to one aspect of the embodiment, the (1) data and/or (2) information and/or (3) at least one signal are further based, at least in part, on the following: at least one determination of the restricted portion, the unrestricted portion, or a combination thereof based, at least in part, on user input, one or more privacy policies, one or more security policies, one or more standards, or a combination thereof.

According to one aspect of the embodiment, the (1) data and/or (2) information and/or (3) at least one signal are further based, at least in part, on the following: a creation of a temporary account, a permanent account, or a combination thereof in the at least one other service based, at least in part, on the transmission of the restructured portion.

According to one aspect of the embodiment, the (1) data and/or (2) information and/or (3) at least one signal are further based, at least in part, on the following: at least one determination of one or more updates to the restricted portion, the unrestricted portion, or a combination thereof in the at least one service, the at least one other service, or a combination thereof; and a synchronization of the one or more updates to the at least one service, the at least one other service, or a combination thereof.

According to another embodiment, an apparatus comprising: at least one processor; and at least one memory including computer program code for one or more programs, the at least one memory and the computer program code configured to, with the at least one processor, cause the apparatus to perform at least the following, determine that a user has been authenticated for an access to at least one service using a federated identity, wherein the federated identity is associated with the at least one service, at least one or more other services, or a combination thereof; determine federated account information associated with the user based, at least in part, on one or more user accounts associated with the federated identity, the at least one service, the at least one or more other services, or a combination thereof; and determine one or more functions of the at least one service, the at least one or more other services, or a combination thereof to make available to the user based, at least in part, on the federated account information.

According to one aspect of the embodiment, the apparatus is further caused to: cause, at least in part, a creation of at least one shadow account based, at least in part, on the federated account information, wherein the at least one shadow account associates the user with respective one or more of the at least one service, the at least one other service, or a combination thereof.

According to one aspect of the embodiment, the apparatus is further caused to determine at least a portion of the federated account information, the one or more user accounts, or a combination thereof to include in the at least one shadow account based, at least in part, on one or more privacy policies, one or more security policies, or a combination thereof associated with the at least one service, the at least one other service, or a combination thereof.

According to one aspect of the embodiment, the apparatus is further caused to determine to generate at least one recommendation for a conversion of the at least one shadow account to at least one full account associated with the at least one service, the at least one other service, or a combination thereof; and cause, at least in part, an association of the at least one full account with the federated identity.

According to one aspect of the embodiment, the apparatus is further caused to: cause, at least in part, a generation of a request for user authentication credentials for the at least one full account, wherein the user authentication credentials are specific to the at least one full account; and cause, at least in part, an authentication to the at least one full account based, at least in part, on at least one authentication token associated with the federated identity, the user authentication credentials or a combination thereof.

According to one aspect of the embodiment, the apparatus is further caused to: determine a dissolution of the federated identity; and determine to maintain access to the one service, the at least one other service, or a combination thereof via the at least one full account.

According to one aspect of the embodiment, the apparatus is further caused to: determine to provide a differentiated access to the at least one service, the at least one other service, or a combination thereof based, at least in part, on whether the user authenticates via the at least one shadow account, the at least one full account, or a combination thereof.

According to one aspect of the embodiment, the federated account information, the one or more user accounts, or a combination thereof include, at least in part, billing information, payment information, or a combination thereof for the user.

According to one aspect of the embodiment, the apparatus is further caused to: determine a request by the user for another access to the one or more functions, wherein the request relies, at least in part, on the billing information, the payment information, or a combination thereof; and determine to make at least a portion of the billing information, the payment information, or a combination thereof available to the at least one service, the one or more other services, or a combination thereof on the determining of the request.

According to one aspect of the embodiment, the apparatus is further caused to: determine to include the billing information, the payment information, or a combination thereof in at least one billing account associated with the user, the federated identity, the at least one service, the at least one other service, or a combination thereof.

According to another embodiment, an apparatus comprising: at least one processor; and at least one memory including computer program code for one or more programs, the at least one memory and the computer program code configured to, with the at least one processor, cause the apparatus to perform at least the following, process and/or facilitate a processing of user data associated with at least one service to determine a restricted portion of the user data, an unrestricted portion of the user data, or a combination thereof, wherein the at least one service is associated with at least one other service via a federated identity; and cause, at least in part, an initiation of a transmission of the restricted portion from the at least one service to the at least one other service based, at least in part, on a triggering event associated in the at least one other service.

According to one aspect of the embodiment, the triggering event includes, at least in part, a request to access, to purchase, or a combination thereof one or more functions, one or more content, or a combination thereof associated with the at least one other service.

According to one aspect of the embodiment, the restricted portion includes, at least in part, billing information, payment information, or a combination thereof.

According to one aspect of the embodiment, the apparatus is further caused to: determine the restricted portion, the unrestricted portion, or a combination thereof based, at least in part, on user input, one or more privacy policies, one or more security policies, one or more standards, or a combination thereof.

According to one aspect of the embodiment, the apparatus is further caused to: cause, at least in part, a creation of a temporary account, a permanent account, or a combination thereof in the at least one other service based, at least in part, on the transmission of the restructured portion.

According to one aspect of the embodiment, the apparatus is further caused to: determine one or more updates to the restricted portion, the unrestricted portion, or a combination thereof in the at least one service, the at least one other service, or a combination thereof and cause, at least in part, a synchronization of the one or more updates to the at least one service, the at least one other service, or a combination thereof.

According to another embodiment, a method comprises: determining that a user has been authenticated for an access to at least one service using a federated identity, wherein the federated identity is associated with the at least one service, at least one or more other services, or a combination thereof determining federated account information associated with the user based, at least in part, on one or more user accounts associated with the federated identity, the at least one service, the at least one or more other services, or a combination thereof and determining one or more functions of the at least one service, the at least one or more other services, or a combination thereof to make available to the user based, at least in part, on the federated account information.

According to one aspect of the embodiment, the method further comprises causing, at least in part, a creation of at least one shadow account based, at least in part, on the federated account information, wherein the at least one shadow account associates the user with respective one or more of the at least one service, the at least one other service, or a combination thereof.

According to one aspect of the embodiment, the method further comprises determining at least a portion of the federated account information, the one or more user accounts, or a combination thereof to include in the at least one shadow account based, at least in part, on one or more privacy policies, one or more security policies, or a combination thereof associated with the at least one service, the at least one other service, or a combination thereof.

According to one aspect of the embodiment, the method further comprises determining to generate at least one recommendation for a conversion of the at least one shadow account to at least one full account associated with the at least one service, the at least one other service, or a combination thereof and causing, at least in part, an association of the at least one full account with the federated identity.

According to one aspect of the embodiment, the method further comprises causing, at least in part, a generation of a request for user authentication credentials for the at least one full account, wherein the user authentication credentials are specific to the at least one full account; and causing, at least in part, an authentication to the at least one full account based, at least in part, on at least one authentication token associated with the federated identity, the user authentication credentials or a combination thereof.

According to one aspect of the embodiment, the method further comprises determining a dissolution of the federated identity; and determining to maintain access to the one service, the at least one other service, or a combination thereof via the at least one full account.

According to one aspect of the embodiment, the method further comprises determining to provide a differentiated access to the at least one service, the at least one other service, or a combination thereof based, at least in part, on whether the user authenticates via the at least one shadow account, the at least one full account, or a combination thereof.

According to one aspect of the embodiment, the federated account information, the one or more user accounts, or a combination thereof include, at least in part, billing information, payment information, or a combination thereof for the user.

According to one aspect of the embodiment, the method further comprises determining a request by the user for another access to the one or more functions, wherein the request relies, at least in part, on the billing information, the payment information, or a combination thereof; and determining to make at least a portion of the billing information, the payment information, or a combination thereof available to the at least one service, the one or more other services, or a combination thereof on the determining of the request.

According to one aspect of the embodiment, the method further comprises determining to include the billing information, the payment information, or a combination thereof in at least one billing account associated with the user, the federated identity, the at least one service, the at least one other service, or a combination thereof.

According to another embodiment, a method comprises processing and/or facilitating a processing of user data associated with at least one service to determine a restricted portion of the user data, an unrestricted portion of the user data, or a combination thereof, wherein the at least one service is associated with at least one other service via a federated identity; and causing, at least in part, an initiation of a transmission of the restricted portion from the at least one service to the at least one other service based, at least in part, on a triggering event associated in the at least one other service.

According to one aspect of the embodiment, the triggering event includes, at least in part, a request to access, to purchase, or a combination thereof one or more functions, one or more content, or a combination thereof associated with the at least one other service.

According to one aspect of the embodiment, the restricted portion includes, at least in part, billing information, payment information, or a combination thereof.

According to one aspect of the embodiment, the method further comprises determining the restricted portion, the unrestricted portion, or a combination thereof based, at least in part, on user input, one or more privacy policies, one or more security policies, one or more standards, or a combination thereof.

According to one aspect of the embodiment, the method further comprises causing, at least in part, a creation of a temporary account, a permanent account, or a combination thereof in the at least one other service based, at least in part, on the transmission of the restructured portion.

According to one aspect of the embodiment, the method further comprises determining one or more updates to the restricted portion, the unrestricted portion, or a combination thereof in the at least one service, the at least one other service, or a combination thereof; and causing, at least in part, a synchronization of the one or more updates to the at least one service, the at least one other service, or a combination thereof.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
determining that a user has been authenticated for an access to services using a federated identity, wherein the federated identity is associated with the services;
determining federated account information associated with the user based, at least in part, on one or more user accounts associated with the federated identity, and the services;
determining one or more functions of the services to make available to the user based, at least in part, on the federated account information;
creating at least one shadow account based, at least in part, on the federated account information;
generating, by a computing device, at least one recommendation for a conversion of the at least one shadow account to at least one full account requiring a user password, the full account associated with the services, and
associating the at least one full account with the federated identity,
wherein the at least one shadow account is a user account created with a minimal set of fields of data for creating the user account, wherein the fields of data are limited to the federated account information,
wherein the at least one shadow account associates the user with respective services,
wherein the at least one shadow account is configured to capture user session information and provide continuity of user interaction across multiple sessions of the services,
wherein the at least one shadow account is associated with the federated identity via at least one authentication token, and
wherein the recommendation is based on an attempt to access services requiring a full account.

2. The method of claim 1, further comprising:
validating the at least one authentication token as a precondition to the creation of the at least one shadow account.

3. The method of claim 2, further comprising:
determining at least a portion of the federated account information, the one or more user accounts, or a combination thereof to include in the at least one shadow account based, at least in part, on one or more privacy policies, one or more security policies, or a combination thereof associated with the services,
wherein the at least one authentication token is a federated identity token associated with a federation gateway and/or a federated account platform.

4. The method of claim 2, further comprising:
generating a request for user authentication credentials for the at least one full account, wherein the user authentication credentials are specific to the at least one full account; and
authenticating the at least one full account based, at least in part, on the at least one authentication token associated with the federated identity, the user authentication credentials or a combination thereof.

5. The method of claim 4, further comprising:
determining a dissolution of the federated identity; and
determining to maintain access to the services via the at least one full account.

6. The method of claim 2, further comprising:
providing a differentiated access to the services based, at least in part, on whether the user authenticates via the at least one shadow account, the at least one full account, or a combination thereof.

7. The method of claim 1, wherein the federated account information, the one or more user accounts, or a combination thereof include, at least in part, billing information, payment information, or a combination thereof for the user.

8. The method of claim 7, further comprising:
determining a request by the user for another access to the one or more functions, wherein the request relies, at least in part, on the billing information, the payment information, or a combination thereof; and making at least a portion of the billing information, the payment information, or a combination thereof available to the services on the determining of the request.

9. The method of claim 7, further comprising:

including the billing information, the payment information, or a combination thereof in at least one billing account associated with the user, the federated identity, and the services.

10. An apparatus comprising:

at least one microprocessor; and at least one memory including computer program code for one or more programs, the at least one memory and the computer program code configured to, with the at least one microprocessor, cause the apparatus to perform at least the following, determine that a user has been authenticated for an access to services using a federated identity, wherein the federated identity is associated with the services, determine federated account information associated with the user based, at least in part, on one or more user accounts associated with the federated identity, and the services, determine one or more functions of the services to make available to the user based, at least in part, on the federated account information, creating at least one shadow account based, at least in part, on the federated account information, generate at least one recommendation for a conversion of the at least one shadow account to at least one full account requiring a user password, the full account associated with the services, and associating the at least one full account with the federated identity, wherein the at least one shadow account is a user account created with a minimal set of fields of data for creating the user account, wherein the fields of data are limited to the federated account information, wherein the at least one shadow account associates the user with respective services, wherein the at least one shadow account is configured to capture user session information and provide continuity of user interaction across multiple sessions of the at least one other service, wherein the at least one shadow account is associated with the federated identity via at least one authentication token, and wherein the recommendation is based on an attempt to access services requiring a full account.

11. The apparatus of claim 10, wherein the apparatus is further caused to:

validating the at least one authentication token as a precondition to the creation of the at least one shadow account.

12. The apparatus of claim 11, wherein the apparatus is further caused to:

determine at least a portion of the federated account information, the one or more user accounts, or a combination thereof to include in the at least one shadow account based, at least in part, on one or more privacy policies, one or more security policies, or a combination thereof associated with the services, wherein the at least one authentication token is a federated identity token associated with a federation gateway and/or a federated account platform.

13. The apparatus of claim 11, wherein the apparatus is further caused to:

generating a request for user authentication credentials for the at least one full account, wherein the user authentication credentials are specific to the at least one full account, and authenticating the at least one full account based, at least in part, on the at least one authentication token associated with the federated identity, the user authentication credentials or a combination thereof.

14. The apparatus of claim 13, wherein the apparatus is further caused to:

determine a dissolution of the federated identity, and maintaining access to the services via the at least one full account.

15. The apparatus of claim 11, wherein the apparatus is further caused to:

providing a differentiated access to the services based, at least in part, on whether the user authenticates via the at least one shadow account, the at least one full account, or a combination thereof.

16. The apparatus of claim 10, wherein the federated account information, the one or more user accounts, or a combination thereof include, at least in part, billing information, payment information, or a combination thereof for the user.

17. The apparatus of claim 16, wherein the apparatus is further caused to:

determine a request by the user for another access to the one or more functions, wherein the request relies, at least in part, on the billing information, the payment information, or a combination thereof, and making at least a portion of the billing information, the payment information, or a combination thereof available to the services on the determining of the request.

18. The apparatus of claim 16, wherein the apparatus is further caused to:

including the billing information, the payment information, or a combination thereof in at least one billing account associated with the user, the federated identity, and the services.

19. A non-transitory computer-readable storage medium carrying one or more sequences of one or more instructions which, when executed by one or more microprocessors, cause an apparatus to perform at least a method:

determining that a user has been authenticated for an access to services using a federated identity, wherein the federated identity is associated with the services;

determining federated account information associated with the user based, at least in part, on one or more user accounts associated with the federated identity, and the services;

determining one or more functions of the services to make available to the user based, at least in part, on the federated account information;

creating at least one shadow account based, at least in part, on the federated account information;

generating at least one recommendation for a conversion of the at least one shadow account to at least one full account requiring a user password, the full account associated with the services, and associating the at least one full account with the federated identity, wherein the at least one shadow account is a user account created with a minimal set of fields of data for creating the user account and taken from the federated account information, wherein the at least one shadow account associates the user with respective services, wherein the at least one shadow account is configured to capture user session information and provide continuity of user interaction across multiple sessions of the at least one other service, wherein the at least one shadow account is associated with the federated identity via at least one authentication token, and wherein the recommendation is based on an attempt to access services requiring a full account.

20. The method of claim 1, wherein:

the conversion includes dissolution of the at least one shadow account and a creation of the at least one full account, and the services are from two or more service providers.

* * * * *